(12) United States Patent
Kwak et al.

(10) Patent No.: US 12,210,387 B2
(45) Date of Patent: *Jan. 28, 2025

(54) ELECTRONIC DEVICE INCLUDING FLEXIBLE DISPLAY

(71) Applicant: Samsung Electronics Co., Ltd., Gyeonggi-do (KR)

(72) Inventors: Myunghoon Kwak, Gyeonggi-do (KR); Jooyoung Kang, Gyeonggi-do (KR); Jungchul An, Gyeonggi-do (KR); Heuisoo Jeon, Gyeonggi-do (KR); Kwangtai Kim, Gyeonggi-do (KR); Donghyun Yeom, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/198,510

(22) Filed: May 17, 2023

(65) Prior Publication Data

US 2023/0288962 A1    Sep. 14, 2023

Related U.S. Application Data

(63) Continuation of application No. 17/527,468, filed on Nov. 16, 2021, now Pat. No. 11,693,452, which is a
(Continued)

(30) Foreign Application Priority Data

Sep. 28, 2020    (KR) .................. 10-2020-0125692

(51) Int. Cl.
G06F 1/16    (2006.01)
(52) U.S. Cl.
CPC .......... *G06F 1/1652* (2013.01); *G06F 1/1624* (2013.01)

(58) Field of Classification Search
CPC .............................. G06F 1/1652; G06F 1/1624
See application file for complete search history.

(56) References Cited

U.S. PATENT DOCUMENTS 7,480,524 B2    1/2009  Moon
9,286,812 B2    3/2016  Bohn
(Continued)

FOREIGN PATENT DOCUMENTS

CN    101976101    2/2011
JP    2006-128808    5/2006
(Continued)

OTHER PUBLICATIONS

International Search Report dated Sep. 8, 2021 issued in counterpart application No. PCT/KR2021/006300, 8 pages.
(Continued)

*Primary Examiner* — Sagar Shrestha
(74) *Attorney, Agent, or Firm* — The Farrell Law Firm, P.C.

(57) ABSTRACT

An electronic device includes a first housing; a second housing configured to be sliding relative to the first housing; a flexible display, wherein at least part of the flexible display is supported by the second housing and a size of the flexible display viewable from a front surface of the electronic device changes in accordance with a sliding of the second housing; a guide member configured to operatively connect at least part of the first housing and at least part of the second housing for the sliding of the second housing; and a conductive layer disposed between a portion of the second housing and the flexible display, wherein the second housing includes a first support portion supporting a first portion of the flexible display; and a second support portion supporting a second portion of the flexible display and allowing the second portion of the flexible display to be bent, and wherein the conductive layer is configured to electrically connect at
(Continued)

least a part of the flexible display and the second support portion.

20 Claims, 18 Drawing Sheets

Related U.S. Application Data continuation of application No. 17/330,904, filed on May 26, 2021, now Pat. No. 11,204,629.

(56) References Cited

U.S. PATENT DOCUMENTS

| | | | |
|---|---|---|---|
| 9,817,443 | B2 | 11/2017 | Kim |
| 10,079,425 | B2 | 9/2018 | Chun et al. |
| 10,553,135 | B2 | 2/2020 | Lee |
| 10,615,485 | B2 | 4/2020 | Chun et al. |
| 10,747,269 | B1 * | 8/2020 | Choi ................ H04M 1/0237 |
| 10,955,876 | B1 | 3/2021 | Song |
| 10,972,592 | B2 | 4/2021 | Song et al. |
| 11,003,207 | B2 | 5/2021 | Kim et al. |
| 11,003,219 | B1 | 5/2021 | Kim |
| 11,012,546 | B1 | 5/2021 | Song |
| 11,058,018 | B1 | 7/2021 | Yoon |
| 11,184,980 | B2 | 11/2021 | An et al. |
| 11,243,575 | B1 | 2/2022 | Kang |
| 11,357,109 | B2 | 6/2022 | An et al. |
| 11,431,076 | B2 | 8/2022 | Chun et al. |
| 2012/0212433 | A1 | 8/2012 | Lee |
| 2013/0058063 | A1 * | 3/2013 | O'Brien ............. G06F 1/1624 361/807 |
| 2014/0194165 | A1 | 7/2014 | Hwang |
| 2014/0240178 | A1 | 8/2014 | Chun |
| 2016/0081204 | A1 * | 3/2016 | Park ................. G06F 1/1652 361/807 |
| 2018/0120896 | A1 | 5/2018 | Wallace |
| 2019/0067795 | A1 * | 2/2019 | Shin ................... H01Q 1/2283 |
| 2019/0268455 | A1 * | 8/2019 | Baek ................... G06F 3/0412 |
| 2019/0317550 | A1 | 10/2019 | Kim et al. |
| 2020/0264660 | A1 | 8/2020 | Song et al. |
| 2020/0267246 | A1 | 8/2020 | Song et al. |
| 2020/0267247 | A1 | 8/2020 | Song et al. |
| 2020/0267838 | A1 * | 8/2020 | An ..................... H05K 5/0004 |
| 2020/0363841 | A1 * | 11/2020 | Kim ................... G06F 1/1626 |
| 2020/0371558 | A1 | 11/2020 | Kim |
| 2021/0120111 | A1 * | 4/2021 | Choi .................. G06F 1/1624 |
| 2021/0135492 | A1 * | 5/2021 | Kim ......................... H02J 7/02 |
| 2021/0219437 | A1 * | 7/2021 | Kim ................... H04M 1/0237 |
| 2021/0263552 | A1 | 8/2021 | Kim et al. |
| 2021/0405703 | A1 | 12/2021 | Song |
| 2022/0182477 | A1 * | 6/2022 | Kim ................... H04M 1/0237 |

FOREIGN PATENT DOCUMENTS

| | | |
|---|---|---|
| JP | 2014-036336 | 2/2014 |
| KR | 10-2006-0016369 | 2/2006 |
| KR | 10-2014-0105886 | 9/2014 |
| KR | 10-2019-0086305 | 7/2019 |
| KR | 10-2019-0119719 | 10/2019 |
| KR | 10-2019-0143029 | 12/2019 |
| KR | 10-2020-0099455 | 8/2020 |
| KR | 10-2020-0101116 | 8/2020 |

OTHER PUBLICATIONS

Indian Examination Report dated Jun. 12, 2024 issued in counterpart application No. 202337028731, 6 pages.
Korean Office Action dated Jun. 25, 2024 issued in counterpart application No. 10-2021-0105161, 11 pages.
European Search Report dated Feb. 9, 2024 issued in counterpart application No. 21872664.4-1224, 4 pages.

* cited by examiner

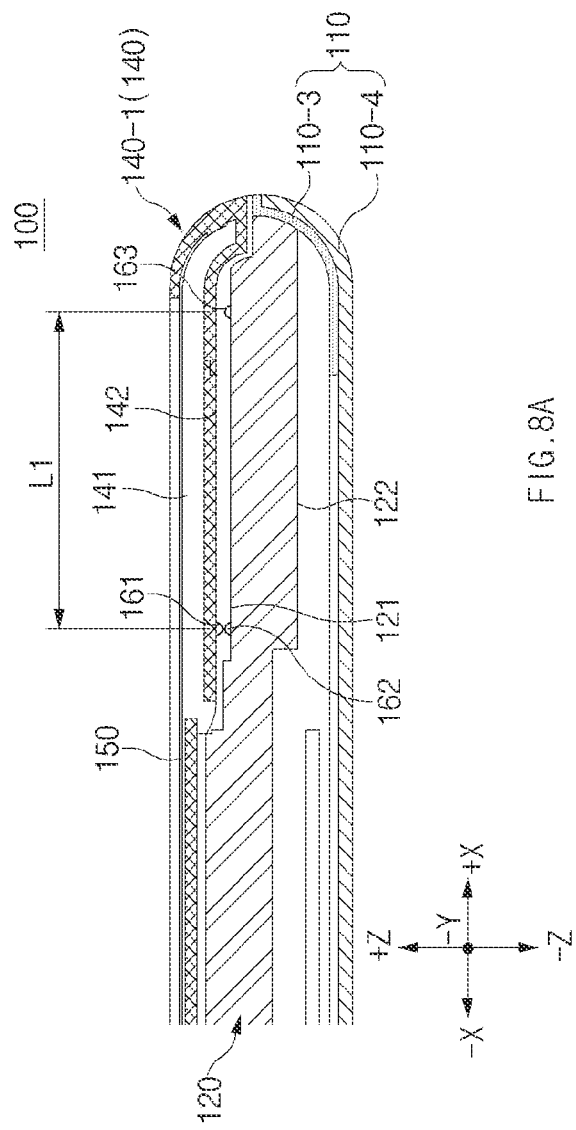
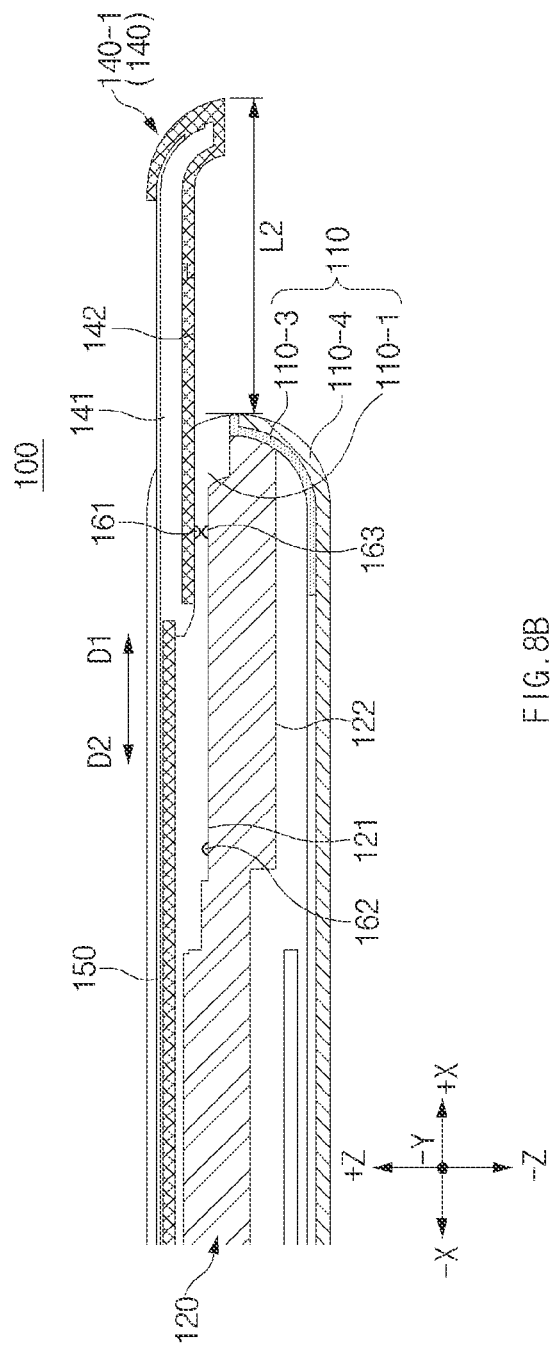

ELECTRONIC DEVICE INCLUDING FLEXIBLE DISPLAY

CROSS-REFERENCE TO RELATED APPLICATION(S)

This application is a Continuation Application of U.S. patent application Ser. No. 17/527,468, filed on Nov. 16, 2021, in the U.S. Patent and Trademark Office, which is a Continuation Application of U.S. patent application Ser. No. 17/330,904, filed on May 26, 2021, issued as U.S. Pat. No. 11,204,629 on Dec. 21, 2021, and is based on and claims priority under 35 U.S.C. § 119 to Korean Patent Application No. 10-2020-0125692, filed on Sep. 28, 2020, in the Korean Intellectual Property Office, the disclosure of each of which is incorporated by reference herein in its entirety.

BACKGROUND

1. Field

The disclosure relates generally to an electronic device including a flexible display.

2. Description of Related Art

An electronic device may include a flexible display and may expand a display area visually exposed on the exterior of the electronic device. For example, the flexible display may be disposed in a curved, foldable, or rollable form in the electronic device.

Various forms of electronic devices have been developed to ensure an expanded display area without affecting portability. For example, electronic devices may include a slide type electronic device in which a first structure (e.g., a first housing) and a second structure (e.g., a second housing) slide relative to each other or a foldable type electronic device in which a first housing and a second housing are disposed to be folded or unfolded.

In the case of the slide type electronic device among the various forms of electronic devices, a display area exposed on a front surface of the electronic device may be expanded as a flexible display is withdrawn by sliding of the first structure (e.g., the first housing) and the second structure (e.g., the second housing). For example, at least part of the flexible display may be disposed to face toward a rear surface of the electronic device as the flexible display is rolled in a state in which the first structure and the second structure are closed and overlap each other.

However, when switching states, the electronic device may experience infiltration of foreign matter into the electronic device, which may degrade the quality of the electronic device over time. In addition, various sliding designs may experience noise and interference among components of the electronic device.

SUMMARY

The present disclosure has been made to address the above-mentioned problems and disadvantages, and to provide at least the advantages described below.

In accordance with an aspect of the disclosure, an electronic device includes a first housing; a second housing configured to be sliding relative to the first housing; a flexible display, wherein at least part of the flexible display is supported by the second housing and a size of the flexible display viewable from a front surface of the electronic device changes in accordance with a sliding of the second housing; a guide member configured to operatively connect at least part of the first housing and at least part of the second housing for the sliding of the second housing; and a conductive layer disposed between a portion of the second housing and the flexible display, wherein the second housing includes a first support portion supporting a first portion of the flexible display; and a second support portion supporting a second portion of the flexible display and allowing the second portion of the flexible display to be bent, and wherein the conductive layer is configured to electrically connect at least a part of the flexible display and the second support portion.

In accordance with another aspect of the disclosure, a first housing; a second housing slidably connected to the first housing; a flexible display supported by the first housing and the second housing; a roller disposed on one side of the first housing so as to be rotatable, a belt having opposite end portions connected to the second housing, and a conductive layer disposed between a portion of the second housing and the flexible display; wherein the second housing includes a plurality of protrusions forming a multi joint structure, and wherein the conductive layer is configured to electrically connect at least a part of the flexible display and the plurality of protrusions.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 8A illustrates an operation in which the conductive structures make contact with each other in the first state of the electronic device, according to an embodiment;

FIG. 8B illustrates an operation in which the conductive structures make contact with each other in the second state of the electronic device, according to an embodiment;

DETAILED DESCRIPTION

Figure 1:
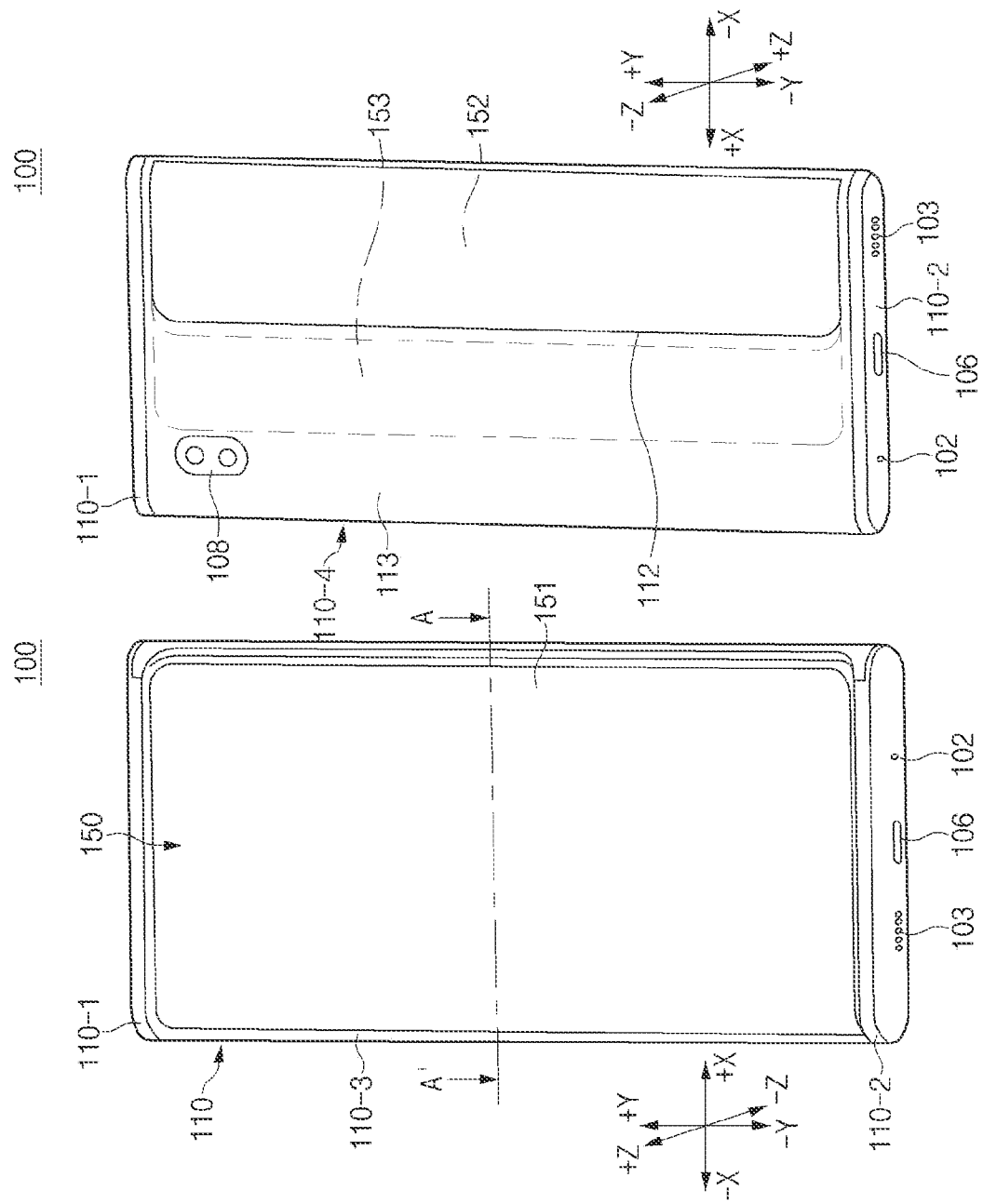
FIG. 1 is a view illustrating a first state of an electronic device, according to an embodiment.

Various embodiments of the disclosure are described with reference to the accompanying drawings. However, various embodiments of the disclosure are not limited to particular embodiments, and it should be understood that modifications, equivalents, and/or alternatives of the embodiments described herein can be variously made. With regard to description of drawings, similar components may be marked by similar reference numerals.

One aspect of the disclosure is to provide an electronic device including a conductive structure for ground contact of a first structure and a second structure when the electronic device is in an open state and a closed state.

Figure 2:
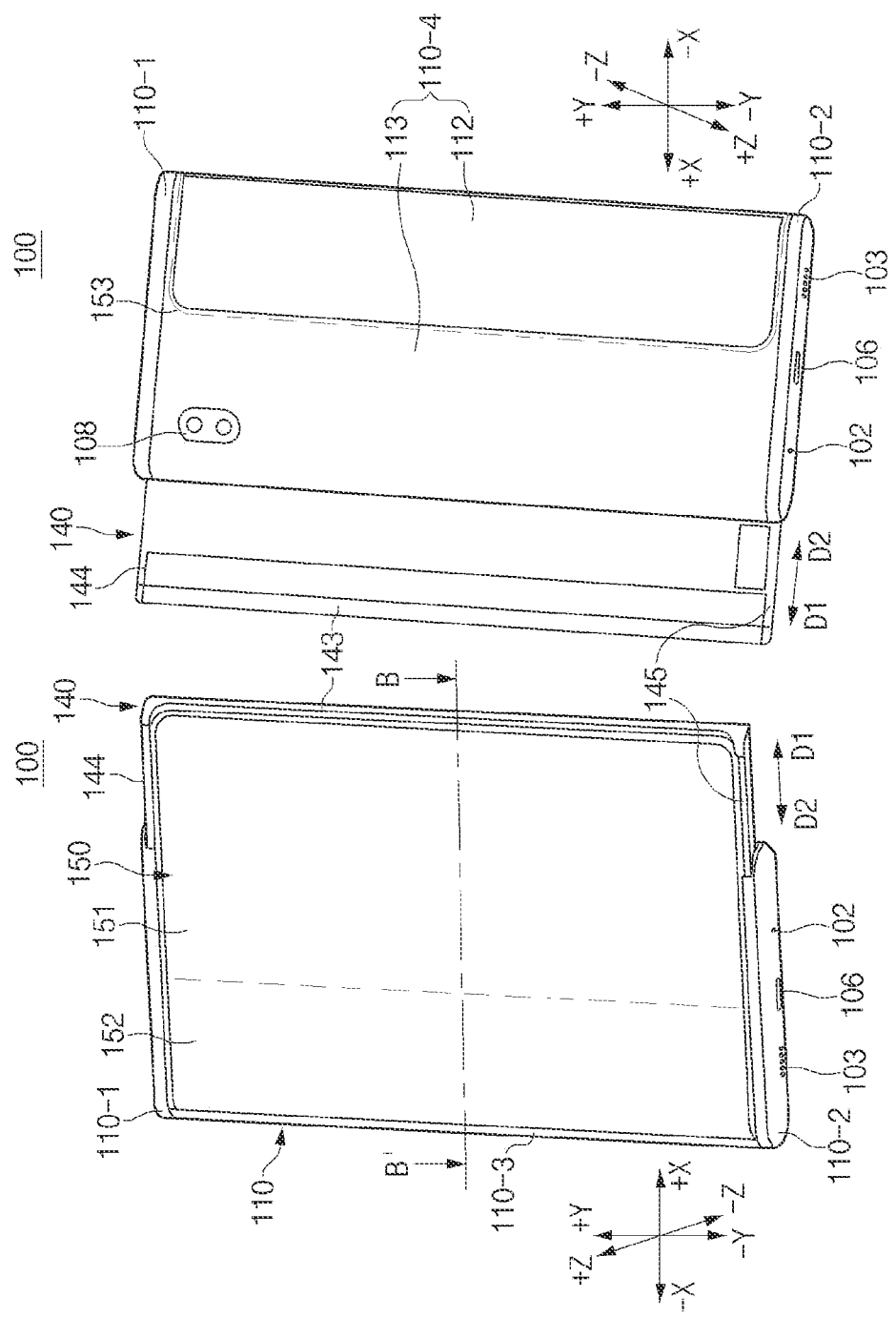
FIG. 2 is a view illustrating a second state of the electronic device, according to an embodiment.

FIG. 1 is a view illustrating a first state of an electronic device, according to an embodiment. FIG. 2 is a view illustrating a second state of the electronic device, according to an embodiment.

FIG. 1 is a view illustrating a front surface and a rear surface of the electronic device when the electronic device is in the first state. FIG. 2 is a view illustrating the front surface and the rear surface of the electronic device when the electronic device is in the second state.

Referring to FIGS. 1 and 2, the electronic device 100 includes a case 110, a second structure 140, and a display 150. The electronic device 100 may be in the first state (e.g., the state of FIG. 1) or the second state (e.g., the state of FIG. 2). For example, the first state and the second state of the electronic device 100 may be determined depending on the position of the second structure 140 relative to the case 110, and the electronic device 100 may be configured to be changed between the first state and the second state by a user operation or a mechanical operation.

The first state of the electronic device 100 may refer to a closed state in which at least part (e.g., a first peripheral portion 143) of the second structure 140 makes contact with the case 110. The second state of the electronic device 100 may refer to an open state in which the at least part (e.g., the first peripheral portion 143) of the second structure 140 is spaced apart from the case 110. The state in which part (e.g., a second peripheral portion 144 or a third peripheral portion 145) of the second structure 140 is inserted into a side member 110-1 or 110-2 of the case 110 as illustrated in FIG. 1 may be defined as the first state. The state in which the part (e.g., the second peripheral portion 144 or the third peripheral portion 145) of the second structure 140 is withdrawn from the side member 110-1 or 110-2 of the case 110 as illustrated in FIG. 2 may be defined as the second state.

The surface facing substantially the same direction as at least part (e.g., a first region 151) of the display 150 included in the electronic device 100 may be defined as the front surface of the electronic device 100, and the surface facing away from the front surface may be defined as the rear surface of the electronic device 100. The front surface of the electronic device 100 may refer to surfaces that form the exterior of the electronic device 100 when the electronic device 100 is viewed in a direction perpendicular to part (e.g., the first region 151) of the display 150 that is included in the electronic device 100 (or, located on the exterior of the electronic device 100). The rear surface of the electronic device 100 may refer to surfaces that form the exterior of the electronic device 100 when the electronic device 100 is viewed in a direction perpendicular to a back cover 110-4 (or, a rear member). The outer surface of the electronic device 100 that substantially faces the +Z-axis direction may be construed as the front surface of the electronic device 100, and the outer surface of the electronic device 100 that substantially faces the −Z-axis direction may be construed as the rear surface of the electronic device 100.

The case 110 may form at least part of the exterior of the electronic device 100. The electronic device 100 may be changed to the first state and the second state as the second structure 140 and the display 150 slide relative to the case 110 in both directions (e.g., a first direction D1 and a second direction D2).

The case 110 may include the first side member 110-1, the second side member 110-2, and rear members 110-3 and 110-4. The first side member 110-1 and the second side member 110-2 may be disposed to face each other in a direction substantially perpendicular to the directions in which the second structure 140 slides. The rear members 110-3 and 110-4 may include the frame 110-3 and the back cover 110-4. The rear members 110-3 and 110-4 may be disposed between the first side member 110-1 and the second side member 110-2 and may be connected to the first side member 110-1 and the second side member 110-2. For example, one end portion (e.g., an end portion facing the +Y-axis direction) of each of the rear members 110-3 and 110-4 may be connected with one end portion of the first side member 110-1, and an opposite end portion (e.g., an end portion facing the −Y-axis direction) of each of the rear members 110-3 and 110-4 may be connected with one end portion of the second side member 110-2.

The first side member 110-1 and the second side member 110-2 may be disposed on the opposite end portions of each of the rear members 110-3 and 110-4. As the second structure 140 and/or the display 150 slides between the first side member 110-1 and the second side member 110-2, the second structure 140 and/or at least part of the display 150 may be inserted into the case 110 or may be withdrawn from the case 110. For example, when the electronic device 100 is changed from the first state to the second state, the second structure 140 and at least part (e.g., the first region 151) of the display 150 may move in the first direction D1 between the first side member 110-1 and the second side member 110-2, and another part (e.g., a third region 153) of the display 150 may move in the second direction D2. In contrast, when the electronic device 100 is changed from the second state to the first state, the second structure 140 and the at least part (e.g., the first region 151) of the display 150 may move in the second direction D2 between the first side member 110-1 and the second side member 110-2, and the other part (e.g., the third region 153) of the display 150 may move in the first direction D1.

When viewed from the front surface (e.g., the surface facing the +Z-axis direction) of the electronic device 100, the frame 110-3 may be disposed such that at least part of the frame 110-3 overlaps the second structure 140 and/or the display 150 in the +Z/−Z-axis direction, and only another part of the frame 110-3 may be exposed in a lateral direction (e.g., the +X/−X-axis direction) of the electronic device 100. Furthermore, when viewed from the rear surface (e.g., the surface facing the −Z-axis direction) of the electronic device 100, the frame 110-3 may overlap the back cover 104 in the +Z/−Z-axis direction and may be hidden by the back cover 110-4 so as not to be visually exposed to a user.

The back cover 110-4 may form at least part of the rear surface of the electronic device 100. For example, the back cover 110-4 may be disposed between the first side member 110-1 and the second side member 110-2. In addition, the back cover 110-4 may be disposed to at least partially overlap the frame 110-3 such that the frame 110-3 is not exposed on the rear surface of the electronic device 100.

The back cover 110-4 may include a window region 112 and an opaque region 113. The window regions 112 may be formed of a transparent or translucent material. For example, the window region 112 may be implemented with at least a partial region of the back cover 110-4 that is formed of a transparent or translucent material. At least part (e.g., the opaque region 113) of the back cover 110-4 may be formed of polymer, coated or colored glass, ceramic, metal (e.g., aluminum, stainless steel (STS), or magnesium), or a combination of at least two of the aforementioned materials. The entire region of the back cover 110-4 may be formed to be opaque.

A second region 152 or the third region 153 of the display 150 may be visually exposed on the rear surface of the electronic device 100 through the window region 112. For example, in the first state of the electronic device 100, at least part of the second region 152 may be visually exposed in a direction toward the rear surface of the electronic device 100 through the window region 112 of the electronic device 100 of FIG. 1. In the second state of the electronic device 100, at least part of the third region 153 may be visually exposed in a direction toward the rear surface of the electronic device 100 through the window region 112 of the electronic device 100 of FIG. 2.

The first side member 110-1, the second side member 110-2, and/or the rear members (e.g., the frame 110-3 and the back cover 110-4) of the case 110 may be integrally formed. Additionally or alternatively, the first side member 110-1, the second side member 110-2, and/or the rear members (e.g., the frame 110-3 and the back cover 110-4) may be formed as separate components and may be assembled or fastened with one another.

The second structure 140 may be configured to slide relative to the case 110. For example, at least part of the second structure 140 may move relative to the case 110 in the first direction D1 or the second direction D2 in a state of being substantially parallel to the case 110.

The second structure 140 may include the plurality of peripheral portions 143, 144, and/or 145 that surround at least part of the periphery of the display 150. The plurality of peripheral portions 143, 144, and/or 145 may include the first peripheral portion 143 extending in a direction perpendicular to the sliding directions of the second structure 140 (e.g., the first direction D1 and the second direction D2), the second peripheral portion 144 that is connected with one end portion (e.g., an end portion facing the +Y-axis direction) of the first peripheral portion 143 and that extends in a direction parallel to the sliding directions of the second structure 140 (e.g., the first direction D1 and the second direction D2), and the third peripheral portion 145 that is connected with an opposite end portion (e.g., an end portion facing the −Y-axis direction) of the first peripheral portion 143 and that extends in the direction parallel to the sliding directions of the second structure 140.

When the electronic device 100 is in the first state, the first peripheral portion 143 may be disposed between the first side member 110-1 and the second side member 110-2 and may be exposed on the exterior of the electronic device 100. At least part of the first peripheral portion 143 may make contact with the first side member 110-1 and the second side member 110-2 in the first state and, when the electronic device 100 is changed from the first state to the second state, may move in the first direction D1 and may be spaced apart from the first side member 110-1 and the second side member 110-2.

The second peripheral portion 144 and the third peripheral portion 145 may be inserted into or withdrawn from the first side member 110-1 and the second side member 110-2, respectively. For example, when the first peripheral portion 143 moves in the first direction D1, the second peripheral portion 144 may be withdrawn from the first side member 110-1, and the third peripheral portion 145 may be withdrawn from the second side member 110-2. In contrast, when the first peripheral portion 143 moves in the second direction D2, at least part of the second peripheral portion 144 may be inserted into the first side member 110-1, and at least part of the third peripheral portion 145 may be inserted into the second side member 110-2.

The display 150 may include the first region 151, the second region 152, and the third region 153. The second region 152 may extend from the first region 151, and the third region 153 may extend from the second region 152. For example, the second region 152 may be located between the first region 151 and the third region 153.

The display 150 may be disposed on the second structure 140. The display 150 may be disposed on one surface of the second structure 140 such that at least part of the periphery of the display 150 is surrounded by the plurality of peripheral portions 143, 144, and/or 145 of the second structure 140. For example, the display 150 may be disposed on the second structure 140 such that at least a partial region of the display 150 faces a direction toward the front surface of the electronic device 100 (e.g., the +Z-axis direction). The display 150 may be configured to move together with the second structure 140 when the second structure 140 slides. For example, the display 150 may be attached to the second structure 140 by an adhesive material (e.g., a double-sided tape or glue).

As the electronic device 100 is changed between the first state and the second state, an exposed region of the display 150 exposed in the direction toward the front surface of the electronic device 100 may be expanded or reduced. For example, in the first state, the first region 151 may be exposed on the front surface of the electronic device 100 to form a front display region. In the second state, at least part of the second region 152, together with the first region 151, may be exposed on the front surface of the electronic device 100 to form the front display region. The front display region may be defined as a region in which a predetermined screen is displayed on the front surface of the electronic device 100.

A rear display region may be defined as a region in which a predetermined screen is displayed on the rear surface of the electronic device 100.

The display 150 may be formed of a flexible material such that, depending on operating states (e.g., the first state and the second state) of the electronic device 100, at least part of the display 150 faces the direction toward the front surface of the electronic device 100 (e.g., the +Z-axis direction) and another part of the display 150 faces the direction toward the rear surface of the electronic device 100 (e.g., the −Z-axis direction).

The first region 151 may be exposed on the front surface of the electronic device 100 in the first state and the second state. The second region 152 may be located inside the case 110 to face the rear members 110-3 and 110-4 in the first state. For example, at least part of the second regions 152 may be visually exposed through the rear surface (e.g., the window region 112) of the electronic device 100 in the first state. Furthermore, at least part of the second region 152, together with the first region 151, may be exposed on the front surface of the electronic device 100 in the second state. The third region 153 may not be exposed by being hidden by the back cover 110-4 in the first state and may be visually exposed through the rear surface (e.g., the window region 112) of the electronic device 100 in the second state. In addition, the entire back cover 110-4 may be formed to be opaque. In this case, the display 150 (e.g., the second region 152 or the third region 153) may not be visually exposed through the rear surface of the electronic device 100 in the first state and the second state.

The electronic device 100 may further include audio modules including the microphone hole 102 and the speaker hole 103. A microphone for obtaining an external sound may be disposed in the microphone hole 102. The speaker hole 103 may include an external speaker hole 103 and/or a receiver hole for a telephone call. In another embodiment, the speaker hole 103 and the microphone hole 102 may be implemented with a single hole, or a speaker (e.g., a piezo speaker) may be included without the speaker hole 103.

The electronic device 100 may further include a front camera module that is exposed on the front surface of the electronic device 100 and a rear camera module 108 that is exposed on the rear surface of the electronic device 100. The front camera module may be exposed through at least a partial region of the display 150. The front camera module (e.g., an under display camera (UDC)) may be disposed under the display 150. For example, at least part of the front camera module may be disposed under the display 150, and the front camera module may be configured to take an image of a subject through part of an active area of the display 150. Alternatively, the front camera module may not be visually exposed on a region of the display 150.

The rear camera module 108 may include a plurality of camera modules (e.g., a dual camera or a triple camera). However, the rear camera module 108 is not necessarily limited to including the plurality of camera modules and may be implemented with one camera module. The front camera module and the rear camera module 108 may include one or more lenses, an image sensor, and/or an image signal processor. The rear camera module 108 and a flash may be disposed on the rear surface of the electronic device 100. The flash may include a light emitting diode or a xenon lamp. Two or more lenses (e.g., a wide angle lens and/or a telephoto lens) and image sensors may be disposed on one surface of the electronic device 100.

The electronic device 100 may further include a connector hole 106. The connector hole 106 may include a first connector hole in which a connector (e.g., a universal serial bus (USB) connector) for transmitting and receiving power and/or data with an external electronic device is received and/or a second connector hole (e.g., an earphone jack) in which a connector for transmitting and receiving audio signals with an external electronic device is received.

Figure 16:
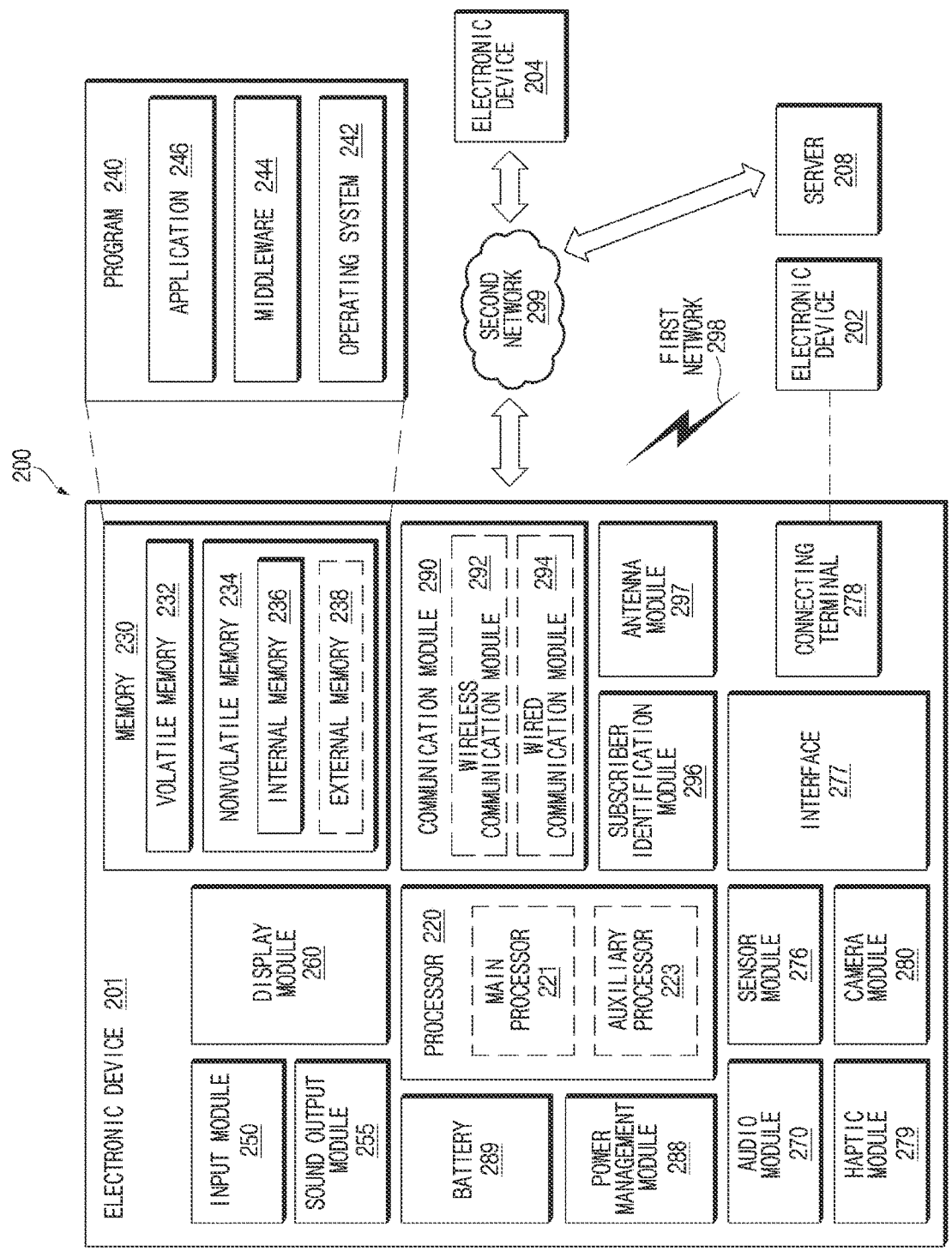
FIG. 16 is a block diagram of an electronic device in a network environment according to an embodiment.

The electronic device 100 may further include a key input device (e.g., an input module 250 of FIG. 16). The key input device may be disposed on a side surface of the electronic device 100. The key input device may be formed as a button type and may be disposed in the first side member 110-1 and/or the second side member 110-2. Furthermore, the key input device may be implemented as a soft key on the display 150.

The electronic device 100 may further include a sensor module 276. The sensor module 276 may generate an electrical signal or a data value that corresponds to an operational state inside the electronic device 100 or an environmental state external to the electronic device 100. The sensor module may include at least one of a proximity sensor, a heart rate monitor (HRM) sensor, a fingerprint sensor, a time of flight (TOF) sensor, an ultrasonic sensor, a gesture sensor, a gyro sensor, an atmospheric pressure sensor, a magnetic sensor, an acceleration sensor, a grip sensor, a color sensor, an infrared (IR) sensor, a biosensor, a temperature sensor, a humidity sensor, or an illuminance sensor.

The electronic device 100 may be changed to the first state (e.g., the state of FIG. 1) and the second state (e.g., the state of FIG. 2) as the second structure 140 slides. For example, the first state may refer to a closed state, and the second state may refer to an open state.

Referring to FIG. 1, the first state may refer to the state in which the first region 151 of the display 150 is exposed on the front surface of the electronic device 100 and the second region 152 of the display 150 is located inside the case 110 to face the rear members 110-3 and 110-4. In the first state, the first region 151 may form the front display region (e.g., a region in which a screen is displayed on the front surface of the electronic device 100). At least part of the second region 152 may form the rear display region (e.g., a region in which a screen is displayed on the rear surface of the electronic device 100) and may be configured to receive a touch input from the outside through the window region 112 of the back cover 110-4 in the first state.

Referring to FIG. 2, the second state may refer to the state in which at least part of the second region 152 of the display 150, together with the first region 151, is exposed on the front surface of the electronic device 100. As the second region 152, together with the first region 151, forms the front display region in the second state, the front display region may be expanded, compared to that in the first state. At least part of the third region 153 of the display 150 may be visually exposed on the rear surface of the electronic device 100 through the window region 112. Additionally, the third region 153 may prevent parts disposed inside the electronic device 100 from being visually exposed on the rear surface of the electronic device 100 through the window region 112. The third region 153 may be configured so as not to form the rear display region or receive a touch input through the window region 112 of the back cover 110-4. In addition, the third region 153 may be configured to form the rear display region or receive a touch input through the window region 112 in the second state.

Figure 3:
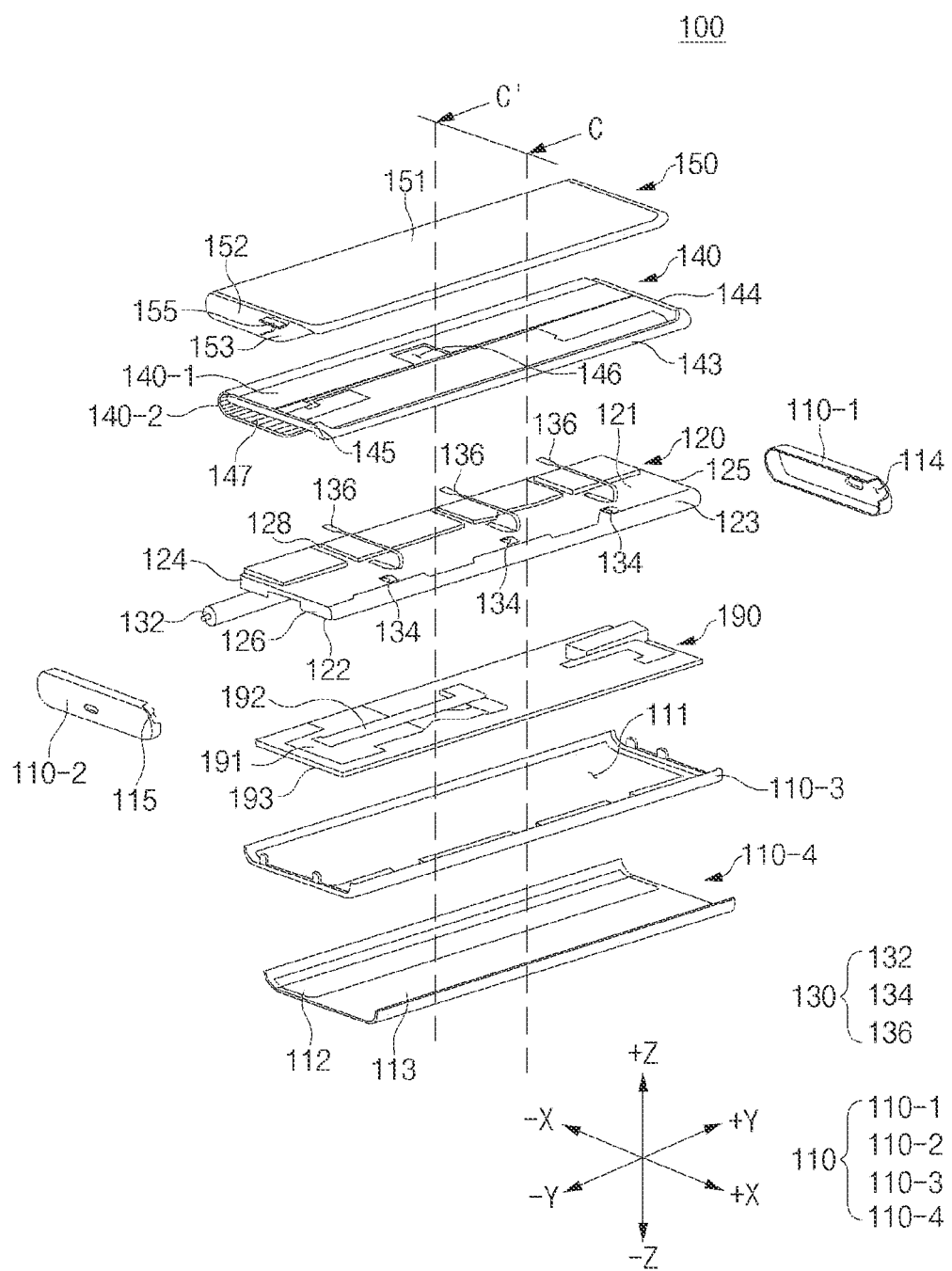
FIG. 3 is an exploded perspective view of the electronic device, according to an embodiment.

FIG. 3 is an exploded perspective view of the electronic device, according to an embodiment.

Referring to FIG. 3, the electronic device 100 includes the case 110, a first structure 120, a guide member 130, the second structure 140, the display 150, and/or a circuit board member 190 (e.g., a printed circuit board (PCB), a flexible PCB (FPCB), or a rigid-flexible PCB (RFPCB)).

The case 110 may include the first side member 110-1, the second side member 110-2, and the rear members (e.g., the frame 110-3 and the back cover 110-4). The case 110 may include the frame 110-3 disposed on an upper surface (e.g., a surface facing the +Z-axis direction) of the back cover 110-4, and the first side member 110-1 and the second side member 110-2 disposed on opposite end portions of the frame 110-3 in a lengthwise direction (e.g., the +Y/−Y-axis direction) to face each other. The first side member 110-1, the second side member 110-2, the frame 110-3, and the back cover 110-4 may be combined together to form a space in which at least a part of other components (e.g., the circuit board member 190, the first structure 120, or the second structure 140) of the electronic device 100 is disposed.

The frame 110-3 may include an opening 111 formed through at least a partial region of the frame 110-3 in an up/down direction (e.g., the +Z/−Z-axis direction). The circuit board member 190 and the back cover 110-4 may be disposed to at least partially face each other through the opening 111. The frame 110-3 may be disposed between the circuit board member 190 and the back cover 110-4, and a lower surface (e.g., a surface facing the −Z-axis direction) of the circuit board member 190 and the upper surface (e.g., the surface facing the +Z-axis direction) of the back cover 110-4 may face each other through the opening 111.

The back cover 110-4 may be disposed under the frame 110-3 (e.g., in the −Z-axis direction). The back cover 110-4 may include the window region 112 formed of a transparent or translucent material and the opaque region 113 surrounding the window region 112. When the rear surface of the electronic device 100 is viewed in the first state (e.g., the state of FIG. 1), the window region 112 may allow a partial region (e.g., at least part of the second region 152) of the display 150 to be visually exposed on the rear surface (or the back cover 110-4) of the electronic device 100.

The first side member 110-1 and the second side member 110-2 may include recesses 114 and 115 formed in peripheral portions thereof, respectively, in a direction substantially parallel to the sliding direction of the second structure 140 (e.g., the +X-axis direction or the −X-axis direction). The recesses 114 and 115 may provide spaces that at least part of the second peripheral portion 144 and at least part of the third peripheral portion 145 of the second structure 140 are inserted into or withdrawn from when the second structure 140 slides relative to the first structure 120. For example, when the electronic device 100 is changed to the first state (e.g., the state of FIG. 1) or the second state (e.g., the state of FIG. 2), the second peripheral portion 144 may move through the recess 114 of the first side member 110-1, and the third peripheral portion 145 may move through the recess 115 of the second side member 110-2.

At least part of the first structure 120 may be disposed inside the case 110. The first structure 120 may be fixed and/or coupled to the case 110. The second structure 140 may slide relative to the first structure 120 and the case 110. The first structure 120 and the case 110 may be formed as separate parts and may be assembled and/or coupled with each other. Additionally or alternatively, the first structure 120 and the case 110 may be integrally formed with each other to form one part.

The first structure 120 may include a first surface 121 (e.g., an upper surface or a surface facing the +Z-axis direction), a second surface 122 (e.g., a lower surface or a surface facing the −Z-axis direction) that faces away from the first surface 121, and a plurality of side surfaces 123, 124, 125, and 126 surrounding a space between the first surface 121 and the second surface 122. The plurality of side surfaces 123, 124, 125, and 126 may include the first side surface 123 extending in a direction (e.g., the +Y/−Y-axis direction) perpendicular to the sliding directions of the second structure 140 (e.g., the first direction D1 and the second direction D2 of FIG. 1), the second side surface 124 facing the first side surface 123, and the third side surface 125 and the fourth side surface 126 that connect the first side surface 123 and the second side surface 124 and face each other. The third side surface 125 may face the first side member 110-1, and the fourth side surface 126 may face the second side member 110-2.

The first structure 120 may be formed of a polymer resin (e.g., polypropylene, polyethylene, polystyrene, polyethylene terephthalate, polyamide, polyester, polyvinyl chloride, polyurethane, polycarbonate, or polyvinylidene chloride) or metal.

At least part of the first structure 120 may be surrounded by the second structure 140. For example, the first surface 121, the second side surface 124, and at least part of the second surface 122 of the first structure 120 may be covered by the second structure 140. The first structure 120 may be connected with the second structure 140 such that the second structure 140 slides relative to the first structure 120.

The guide member 130 may connect and/or support the first structure 120 and at least part of the second structure 140 such that the second structure 140 is able to slide. The guide member 130 may include a first roller member 132, at least one second roller member 134, and at least one belt member 136. Additionally, the second roller member 134 may be omitted. For example, the belt member 136 may extend to the first surface 121 of the first structure 120 while surrounding the second roller member 134. Alternatively, one end portion of the belt member 136 may be connected to a second support portion 140-2 of the second structure 140, and an opposite end portion of the belt member 136 may be connected to the lower surface (e.g., the surface facing the −Z-axis direction) of the first structure 120.

The first roller member 132 may be disposed on the second side surface 124 of the first structure 120, and the second roller member 134 may be disposed on the first side surface 123 of the first structure 120. For example, the first roller member 132 may be disposed to face toward the second side surface 124 from outside the first structure 120 and may be coupled so as to be rotatable relative to the first structure 120. The second roller member 134 may be disposed to face toward the first side surface 123 from inside the first structure 120 and may be coupled so as to be rotatable relative to the first structure 120. The first roller member 132 may include a plurality of rollers.

The belt member 136 may be disposed inside the first structure 120 to at least partially surround the second roller member 134. For example, at least part of the belt member 136 may be received in the first structure 120, and another part of the belt member 136 may be exposed outside the first structure 120. Opposite end portions of the belt member 136 may be connected to different portions of the second structure 140, respectively. The belt member 136 may be implemented with one strap (or band), or may be implemented in a form in which two or more straps (or bands) are fastened with each other. The belt member 136 may be formed of metal and/or a polymer resin.

The belt member 136 may be connected to a first support portion 140-1 and the second support portion 140-2 and may provide tension to pull one end of the second support portion 140-2 with respect to the first support portion 140-1. The opposite end portions of the belt member 136 may be moved in opposite directions by the first roller member 132 and the second roller member 134 when the second structure 140 slides. For example, when the first support portion 140-1 moves in the first direction D1, the one end portion of the belt member 136 connected with the first support portion 140-1 may move in the first direction D1, and the opposite end portion of the belt member 136 connected with the second support portion 140-2 may move in the second direction D2. In contrast, when the first support portion 140-1 moves in the second direction D2, the one end portion of the belt member 136 may move in the second direction D2, and the opposite end portion of the belt member 136 may move in the first direction D1.

The first structure 120 may include, on the first surface 121, a depression 128 in which part of the belt member 136 exposed outside the first structure 120 is disposed. For example, a partial region of the first surface 121 of the first structure 120 may be recessed toward the second surface 122 to form the depression 128. At least part of the belt member 136 may be disposed in the depression 128 and may move together in the depression 128 along a direction (e.g., the +X-axis direction) in which the second structure 140 slides. The belt member 136 may include a plurality of belts, and a plurality of depressions 128 corresponding to the plurality of belts may be formed on the first structure 120. The numbers and/or positions of belt members 136 and depressions 128 may be variously modified. Furthermore, the belt member 136 and/or the depression 128 may have a different length depending on the position in which the belt member 136 is disposed.

The second structure 140 may be connected with the first structure 120 so as to slide relative to the first structure 120, and the case 110 and may move in the +X/−X-axis direction relative to the first structure 120 and the case 110 that are relatively fixed.

The second structure 140 may be disposed to surround at least part of the first structure 120. For example, the second structure 140 may surround the first surface 121, the second side surface 124, and at least a partial region of the second surface 122 of the first structure 120. The first surface 121 and the second side surface 124 of the first structure 120 may be covered by the second structure 140 irrespective of operating states (e.g., the first state and the second state) of the electronic device 100, and the region where the second surface 122 of the first structure 120 is covered by the second structure 140 may be expanded or reduced depending on the operating states of the electronic device 100.

The second structure 140 may support the display 150. For example, the second structure 140 may be closely fixed to the display 150. At least part of the second structure 140 may be attached to the display 150 through an adhesive member (e.g., a double-sided tape or glue) disposed between the display 150 and the second structure 140. The second structure 140, together with the display 150, may slide relative to the first structure 120.

The second structure 140 may include the first support portion 140-1 and the second support portion 140-2. The second support portion 140-2 may extend from the first support portion 140-1 and may be a bendable portion. The first support portion 140-1 may support at least part of the first region 151 of the display 150, and the second support portion 140-2 may support another part of the first region 151, the second region 152, and/or the third region 153 of the display 150. The first support portion 140-1 may be disposed to face part of the first region 151. The second support portion 140-2 may be disposed to face another part of the first region 151, the second region 152, and/or the third region 153.

The first support portion 140-1 may include the first peripheral portion 143, the second peripheral portion 144, and the third peripheral portion 145. The first peripheral portion 143, the second peripheral portion 144, and the third peripheral portion 145 may surround at least part of the first region 151. The first support portion 140-1 may be formed of a substantially flat plate. For example, when the second structure 140 slides, the first support portion 140-1 may not be deformed and may move in a state of being substantially parallel to the first structure 120.

The second support portion 140-2 may be formed of a bendable material so as to at least partially form a curved surface in response to sliding of the second structure 140. A bending portion of the second support portion 140-2 may vary depending on operating states (e.g., the first state and the second state) of the electronic device 100. The second support portion 140-2 may support the display 150 such that the display 150 slides while forming a curved surface in at least a partial region thereof.

The second support portion 140-2 may include a multi joint structure that may have a plurality of protrusions 147 that form the multi joint structure. The plurality of protrusions 147 may protrude toward the first structure 120 in a state in which the second structure 140 surrounds the first structure 120. For example, in a state in which at least some of the protrusions 147 make contact with the first roller member 132, the plurality of protrusions 147 may move as the second structure 140 slides.

The plurality of protrusions 147 may have a predetermined length in a direction (e.g., the +Y/−Y-axis direction) perpendicular to the sliding directions of the second structure 140. The plurality of protrusions 147 may be spaced apart from each other at predetermined intervals along a direction (e.g., the +X/−X-axis direction) substantially parallel to the sliding directions of the second structure 140. The second support portion 140-2 may include a flexible film that extends from and/or connects to one side of the first support portion 140-1, and the protrusions 147 may be disposed on one surface of the flexible film. The display 150 may be disposed on an opposite surface of the flexible film that faces away from the one surface of the flexible film.

The second structure 140 may include a second opening 146 that is formed in at least a partial region of the first support portion 140-1. The display 150 may be electrically connected with a circuit board 191 through the second opening 146 in a state of being disposed on the second structure 140. A connecting member 192 extending from the circuit board 191 may be connected with the display 150 through the second opening 146 and a first opening 129 that is formed in the first structure 120.

The display 150 may be formed to be flexible so as to at least partially form a curved surface in response to sliding of the second structure 140. The display 150 may be formed such that different regions (e.g., the first region 151 and the second region 152) face each other as at least a partial region is bent. The display 150 may include, for example, a flexible display or a foldable display. The entire region of the display 150 may be formed of a flexible material. Alternatively, a partial region of the display 150 may be formed of a flexible material, and another partial region of the display 150 may be formed of a non-flexible material that is not bent.

The display 150 may include the first region 151, the second region 152, and the third region 153. The second region 152 may extend from the first region 151, and the third region 153 may extend from the second region 152. A display region of the display 150 in which a predetermined screen is displayed may be changed based on an area visually exposed on the front surface and/or the rear surface of the electronic device 100. For example, in the first state, the first region 151 may be visually exposed on the front surface of the electronic device 100. In the second state, at least part of the second region 152, together with the first region 151, may be visually exposed on the front surface of the electronic device 100.

The display 150 may be disposed on the second structure 140 and may move together with the second structure 140 relative to the first structure 120 and the case 110. For example, the first region 151 may be fixed to the first support portion 140-1 and the second support portion 140-2, and the second region 152 and the third region 153 may be fixed to the second support portion 140-2. The positions and/or deformation of the regions (e.g., the first region 151, the second region 152, and the third region 153) of the display 150 depending on operating states (e.g., the first state and the second state) of the electronic device 100 will be described below in more detail with reference to FIGS. 4A and 4B.

At least part of the periphery of the third region 153 of the display 150 or a rear surface of the third region 153 may be a portion electrically connected to the circuit board member 190. For example, at least part of the periphery of the third region 153 of the display 150 may extend in one direction (e.g., the +X-axis direction) and may be electrically connected to the circuit board member 190. Additionally or alternatively, the display 150 may include a connector 155 disposed on the rear surface of the third region 153 of the display 150 and may be electrically connected to the circuit board member 190 (e.g., the circuit board 191) through the connecting member 192 (e.g., an FPCB) that is electrically connected to the connector 155.

A driver for driving light emitting elements (e.g., LEDs) included in the display 150 may be disposed on the rear surface of the third region 153 of the display 150 or an extension of the third region 153. The driver may include a drive circuit (e.g., a display driver integrated circuit (DDIC)) and may have a chip on film (COF) structure. Furthermore, the driver may include a touch display driver integrated circuit (TDDI) disposed in a chip on panel (COP) type. As a part is disposed on the rear surface of the third region 153 of the display 150 or the extension of the third region 153, the driver may decrease the distance from the circuit board member 190, thereby reducing electrical noise.

At least part of the display 150 may include a conductive member (e.g., a metal sheet) that may be formed of a flexible material. For example, the metal sheet may provide flexural (e.g., flexible) characteristics to the display 150. At least part of the metal sheet may include a bendable portion, and the bendable portion may include a plurality of openings (or, a plurality of slits) formed at specified intervals and/or a lattice structure and may contribute to the flexural characteristics of the display 150. The flexural characteristics of the display 150 may be determined and/or changed depending on the number of openings (or slits), the arrangement density of the openings, and/or the shape of the openings.

The conductive member (e.g., the metal sheet) may include a plurality of recesses formed at specified intervals, instead of the lattice structure. The plurality of recesses may form a recess pattern, and the recess pattern may contribute to the flexural characteristics of the display 150. The lattice structure or the recess pattern may be expanded to at least part of the first region 151 of the display 150. The conductive member including the lattice structure or the recess pattern may be formed of a plurality of layers.

The conductive member (e.g., the metal sheet) of the display 150 may help to reinforce the electronic device 100 and may perform a function of shielding ambient noise and distributing heat radiated from a heat generating part (e.g., a DDIC). Furthermore, the conductive member may be operatively coupled with a conductive structure 160 and may stably provide performance for electrical noise of the electronic device 100 and/or external interference. The conductive member may contain at least one of copper (Cu), aluminum (Al), stainless steel (SUS), or a laminated member in which SUS and Al are alternately arranged (CLAD).

The circuit board member 190 may be disposed between the first structure 120 and the back cover 110-4. An upper surface of the circuit board member 190 may face the second surface 122 of the first structure 120, and a lower surface of the circuit board member 190 may face the opening 111 of the frame 110-3 and/or the back cover 110-4. Here, the upper surface of the circuit board member 190 may refer to the surface substantially facing the +Z-axis direction or the surface facing toward the first structure 120, and the lower surface may refer to the surface facing away from the upper surface.

Various electronic parts included in the electronic device 100 may be electrically connected to the circuit board member 190. The circuit board member 190 may include a plate 193 and a plurality of circuit boards 191 disposed on the plate 193. At least one of the circuit boards 191 may include a PCB and/or an FPCB. The circuit board 191 may be electrically connected with the display 150 using the connector 155 of the display 150 through the connecting member 192 (e.g., an FPCB) that extends from a partial region of the circuit board 191. A connection structure of the display 150 and the circuit board 191 through the connecting member 192 will be described below with reference to FIGS. 12 to 15B.

A processor 220, a memory 230, and/or an interface 277 may be mounted on the circuit board member 190. The processor 220 may include a main processor 221 and/or an auxiliary processor 223, and the main processor 221 and/or the auxiliary processor 223 may include one or more of a central processing unit, an application processor, a graphic processing unit, an image signal processor, a sensor hub processor, or a communication processor. The memory may include a volatile memory or a nonvolatile memory. The interface may include a high definition multimedia interface (HDMI), a USB interface, a secure digital (SD) card interface, and/or an audio interface. Furthermore, the interface may electrically or physically connect the electronic device 100 with an external electronic device and may include a USB connector, an SD card/multimedia card (MMC) connector, or an audio connector.

A battery 289 may be a device for supplying power to at least one component of the electronic device 100 and may be integrally disposed inside the electronic device 100, or may be disposed so as to be detachable from the electronic device 100.

The electronic device 100 may include an 297 that is disposed between the first structure 120 and the circuit board member 190 or between the circuit board member 190 and the rear member (e.g., the back cover 110-4). The antenna 297 may include a near field communication (NFC) antenna, a wireless charging antenna, and/or a magnetic secure transmission (MST) antenna. The antenna 297 may perform short-range communication with an external device, or may wirelessly transmit and receive electric power required for charging. The electronic device 100 may be configured such that an antenna structure is formed by part of the first side member 110-1 and/or part of the second side member 110-2, or a combination thereof.

Figure 4A:
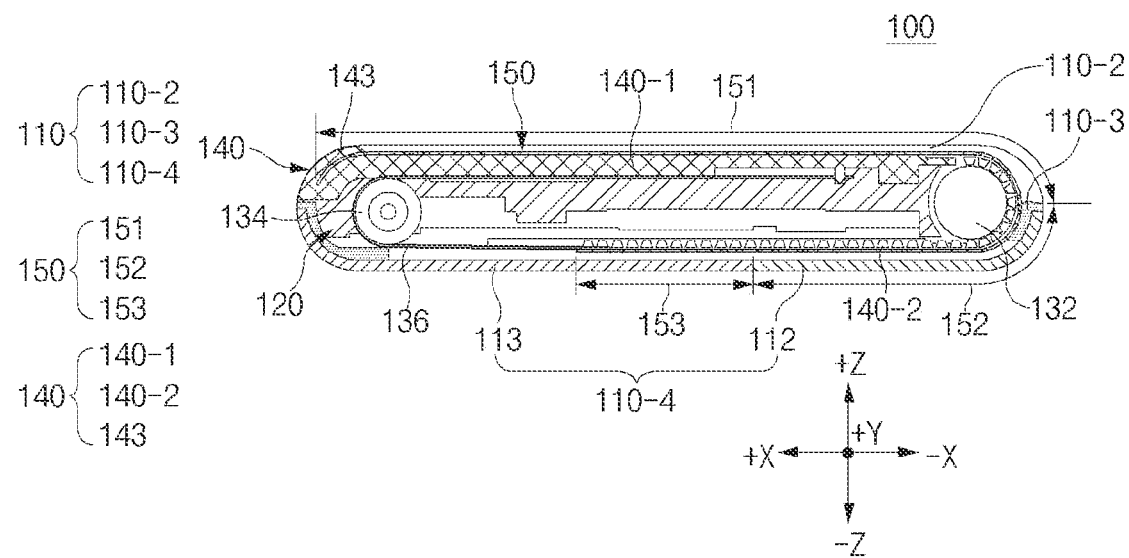
FIG. 4A is a sectional view of the electronic device, according to an embodiment.
Figure 4B:
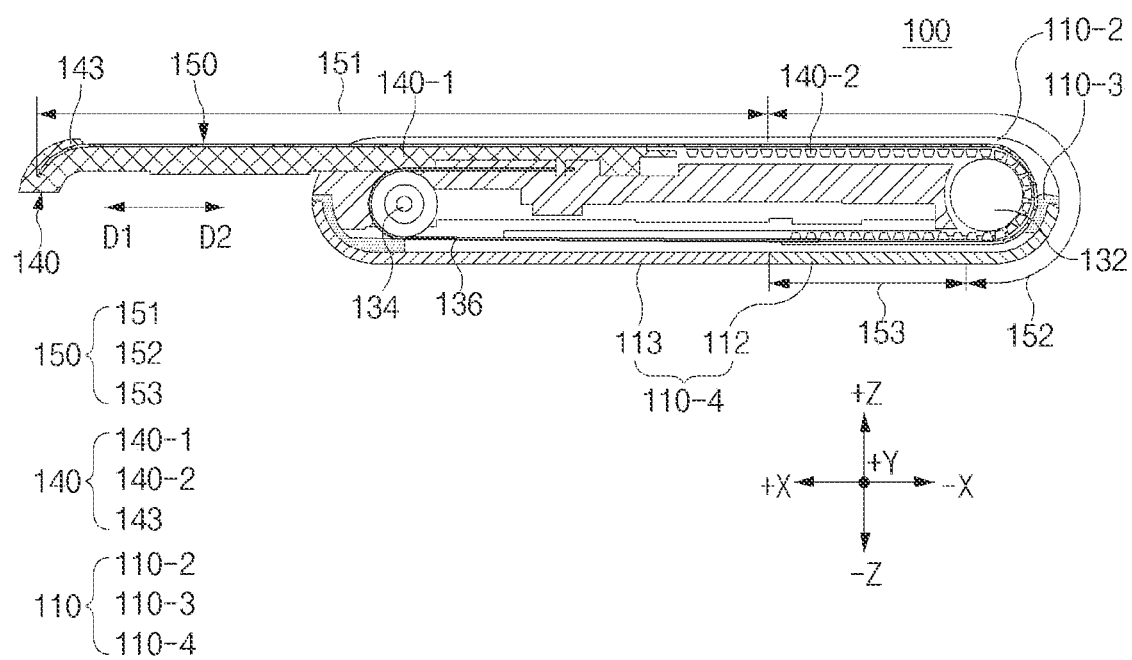
FIG. 4B is a sectional view of the electronic device, according to an embodiment.

FIG. 4A is a sectional view of the electronic device, according to an embodiment. FIG. 4B is a sectional view of the electronic device, according to an embodiment.

FIG. 4A is a sectional view illustrating the first state of the electronic device, and FIG. 4B is a sectional view illustrating the second state of the electronic device.

FIG. 4A illustrates a section of the electronic device taken along line A-A' of FIG. 1, and FIG. 4B illustrates a section of the electronic device taken along line B-B' of FIG. 2. The section taken along line A-A' of FIG. 1, the section taken along line B-B' of FIG. 2, and the section taken along line C-C' of FIG. 3 may be understood as sections of substantially the same portion of the electronic device.

Referring to FIGS. 4A and 4B, the electronic device 100 includes the case 110, the first structure 120, the second structure 140, and the display 150. At least some of the components of the electronic device 100 illustrated in FIGS. 4A and 4B are identical or similar to the components of the electronic device 100 described above with reference to FIGS. 1 to 3. Therefore, repetitive descriptions will be omitted.

The first structure 120 may include the first roller member 132, the second roller member 134, and the belt member 136. The second structure 140 may include the first support portion 140-1 and the second support portion 140-2 extending from the first support portion 140-1 and may be slidably connected to the first structure 120. The display 150 may include the first region 151, the second region 152 extending from the first region 151, and the third region 153 extending from the second region 152 and may be disposed on at least one surface of the second structure 140. The back cover 110-4 may include the window region 112 and the opaque region 113 extending from the window region 112.

The second structure 140 may be disposed to surround at least part of the first structure 120. At least part of the second structure 140 may be disposed over the first structure 120 (e.g., in the +Z-axis direction), and another part of the second structure 140 may be disposed under the first structure 120 (e.g., in the −Z-axis direction).

The first support portion 140-1 of the second structure 140 may be disposed over the first structure 120 (e.g., in the +Z-axis direction), and at least part of the second support portion 140-2 may be disposed under the first structure 120 (e.g., in the −Z-axis direction).

At least part of the second support portion 140-2 may be disposed in a space between the first structure 120 and the back cover 110-4. The area of the second support portion 140-2 disposed between the first structure 120 and the back cover 110-4 may vary depending on operating states (e.g., the first state and the second state) of the electronic device 100. As the second structure 140 slides, at least part of the second support portion 140-2 may be inserted into or withdrawn from the space between the first structure 120 and the back cover 110-4. The display 150 may move together with the second structure 140. For example, as the second structure 140 slides, at least part of the second region 152 of the display 150, together with the second support portion 140-2, may be withdrawn from or inserted into the space between the first structure 120 and the back cover 110-4. When the second structure 140 slides, at least part of the second region 152, together with the second support portion 140-2 of the second structure 140, may move while rotating in response to rotation of the first roller member 132.

When at least part of the second region 152 is withdrawn from between the first structure 120 and the back cover 110-4, a display region exposed on the front surface (e.g., the surface facing the +Z-axis direction) of the electronic device 100 may be expanded. In contrast, when the at least part of the second region 152 is inserted between the first structure 120 and the back cover 110-4, the display region exposed on the front surface of the electronic device 100 may be reduced.

The second structure 140 may be slidably connected to the first structure 120 by the first roller member 132, the second roller member 134, and the belt member 136.

The second support portion 140-2 may be disposed to surround at least part of the first roller member 132, and the belt member 136 may be disposed to surround at least part of the second roller member 134. The first roller member 132 and the second roller member 134 may be disposed so as to be rotatable relative to the first structure 120. For example, the opposite end portions of the belt member 136 may be connected to the first support portion 140-1 and the second support portion 140-2 of the second structure 140. As the second structure 140 and the belt member 136 are connected with each other and the first roller member 132 and the second roller member 134 are disposed between the second structure 140 and the belt member 136, the second structure 140 and the belt member 136 may be slid by rotation of the first roller member 132 and the second roller member 134. Part of the belt member 136 and part of the second support portion 140-2 may be connected together between the first structure 120 and the back cover 110-4, and another component (e.g., the circuit board member 190 of FIG. 3) of the electronic device 100 may be disposed in a space between the belt member 136 and the first structure 120 and/or a space between the second support portion 140-2 and the first structure 120.

The second support portion 140-2 of the second structure 140 may include a form (e.g., a multi joint module) in which a plurality of bars extending in a direction (e.g., the +Y/−Y-axis direction) that is substantially the same as the direction of the axis of rotation of the first roller member 132 are arranged. The second support portion 140-2 may be bent at portions having a relatively small thickness between the plurality of bars. In an embodiment, the second structure 140 may be referred to by another term such as a flexible track or a hinge rail.

The electronic device 100 may be in the first state (e.g., the state of FIG. 1) or the second state (e.g., the state of FIG. 2). The electronic device 100 may be changed to the first state or the second state as the second structure 140 and the display 150 move in the first direction D1 or the second direction D2 relative to the case 110, the first structure 120, and the back cover 110-4. The first state and the second state of the electronic device 100 may be determined depending on the positions of the second structure 140 and the display 150.

When the electronic device 100 is in the first state, the electronic device 100 may be changed to the second state by sliding at least part (e.g., the first support portion 140-1) of the second structure 140 in the first direction D1. In contrast, when the electronic device 100 is in the second state, the electronic device 100 may be changed to the first state by sliding the at least part (e.g., the first support portion 140-1) of the second structure 140 in the second direction D2.

The first peripheral portion 143 of the second structure 140 may be brought into contact with or spaced apart from the second side member 110-2 of the case 110 as the second structure 140 slides. For example, in the first state, the first peripheral portion 143 may make contact with the second side member 110-2 to form substantially the same plane (e.g., refer to FIG. 1), and in the second state, the first peripheral portion 143 may be spaced apart from the second side member 110-2 in the first direction D1 (e.g., refer to FIG. 2). The second side member 110-2 may be formed to further protrude in the +Z-axis direction by a specified height beyond a partial region of the display 150 that faces toward the front surface of the electronic device 100. In the first state, the second side member 110-2 may be formed to be higher than part of the first region 151 in the +Z-axis direction, and in the second state, the second side member 110-2 may be formed to be higher than the first region 151 and part of the second region 152 in the +Z-axis direction.

The relative position between the second side member 110-2 and the first peripheral portion 143 and the height difference between the second side member 110-2 and the display 150 may be identically applied to the first side member 110-1.

Referring to FIG. 4A, when the electronic device 100 is in the first state, the first region 151 of the display 150 may form a display region exposed on the front surface of the electronic device 100, and at least part of the second region 152 may be disposed between the first structure 120 and the back cover 110-4 and may face toward the rear surface of the electronic device 100 (e.g., the +Z-axis direction). At least part of the second regions 152 may be disposed to face the window region 112 of the back cover 110-4, and at least part of the third region 153 may be disposed to face the opaque region 113 of the back cover 110-4. When the electronic device 100 is viewed from the rear, at least part of the second region 152 may be visually exposed on the rear surface of the electronic device 100 through the window region 112, and the third region 153 may be hidden by the opaque region 113 and may not be visually exposed. The window region 112 may extend in the lateral direction (e.g., the −X-axis direction) of the electronic device 100. In this case, at least part of the second region 152 of the display 150 may be visually exposed in the lateral direction of the electronic device 100.

In the first state, the first region 151 of the display 150 may form a display region exposed on the front surface of the electronic device 100, and the second region 152 may form a display region exposed on the rear surface of the electronic device 100. The second region 152 visually exposed on the rear surface of the electronic device 100 through the window region 112 of the back cover 110-4 in the first state may be configured to receive a touch input from the outside, or may be configured to display a predetermined screen.

The electronic device 100 may be configured such that whether to receive a touch input to the second region 152 and whether to display a screen on the second region 152 are determined depending on the direction that the rear surface of the electronic device 100 faces in the first state. When in the first state, the user views the first region 151 of the display 150 from above (e.g., the +Z-axis direction) and the second region 152 faces downward (e.g., the −Z-axis direction), a touch input to the second region 152 may be limited, or a screen may not be displayed on the second region 152. In contrast, when the user views the second region 152 from above and the first region 151 faces downward, a touch input to the second region 152 may be received, and a screen may be displayed on the second region 152. Assuming that the user views the electronic device 100 from a position spaced apart from the electronic device 100 in the +Z-axis direction in FIG. 4A, a touch input to the second region 152 and/or displaying a screen on the second region 152 may be limited when the electronic device 100 is placed such that the second region 152 faces the −Z-axis direction as illustrated in FIG. 4A. In contrast, when the electronic device 100 is turned upside down in the state of FIG. 4A such that the second region 152 faces the +Z-axis direction, a touch input to the second region 152 and/or displaying a screen on the second region 152 may be allowed.

Referring to FIG. 4B, when the electronic device 100 is in the second state, at least part of the second region 152 of the display 150, together with the first region 151, may form a display region exposed on the front surface of the electronic device 100. When the electronic device 100 is changed from the first state to the second state, at least part of the second region 152 facing the back cover 110-4 may be withdrawn from between the first structure 120 and the back cover 110-4 and/or between the first roller member 132 and the back cover 110-4 and may move to the front surface of the electronic device 100. As the electronic device 100 is changed to the second state, part of the second region 152 that is located inside the case 110 of the electronic device 100, and is not exposed when the electronic device 100 is in the first state, may be exposed on the front surface of the electronic device 100, and thus the display region visually exposed on the front surface of the electronic device 100 may be expanded. As the second region 152 moves, at least part of the third region 153 may be disposed to face the window region 112. The third region 153 may prevent other components (e.g., the circuit board member 190) inside the electronic device 100 from being visually exposed through the window region 112 when the electronic device 100 is in the second state.

The third region 153 of the display 150 may be configured differently from the first region 151 and/or the second region 152. The first region 151 and the second region 152 may be configured to display a predetermined screen, or receive a touch input, in the first state or the second state. Unlike the first region 151 and/or the second region 152, the third region 153 may serve to prevent the inside of the electronic device 100 from being visually exposed through the window region 112. The third region 153 may not include a component (e.g., a display panel or an emissive layer) for displaying a screen and/or a component (e.g., a touch panel or a touch sensor) for a touch input. The third region 153 may be configured to display a screen or receive a touch input.

Figure 5:
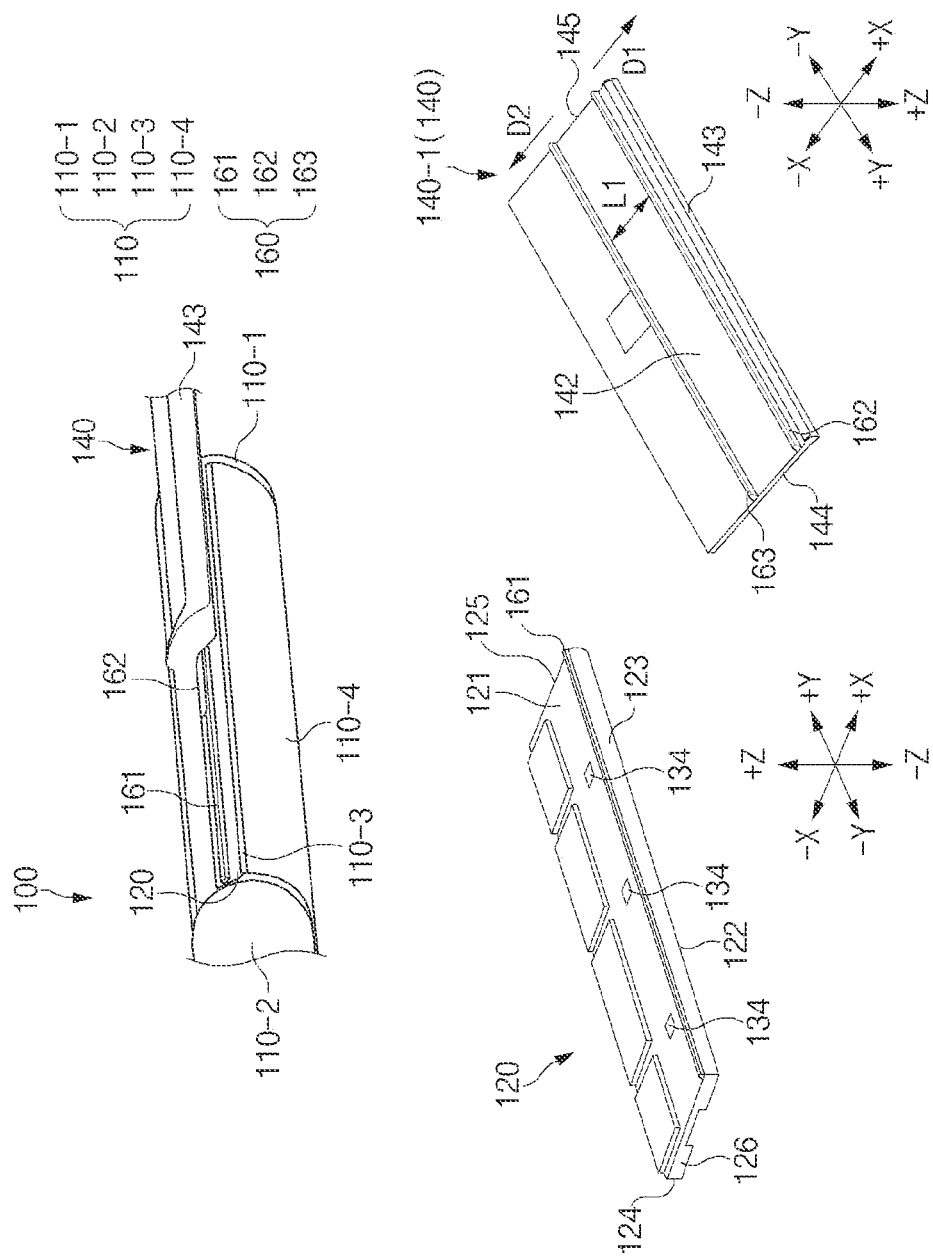
FIG. 5 illustrates a first structure, a second structure, and conductive structures of the electronic device, according to an embodiment.

FIG. 5 illustrates the first structure, the second structure, and conductive structures of the electronic device, according to an embodiment.

FIG. 5 illustrates the second state of the electronic device, illustrates the first structure, and illustrates the first support portion of the second structure. FIG. 5 may be a view in which the second support portion of the second structure is omitted for convenience of description.

Referring to FIG. 5, the electronic device 100 includes the case 110, the first structure 120, the second structure 140, and the conductive structures 160.

The conductive structures 160 may be disposed between at least part of the first structure 120 and at least part (e.g., the first support portion 140-1) of the second structure 140. The conductive structures 160 may be disposed on the first structure 120 and the second structure 140. The conductive structures 160 may make contact with each other in the first state and the second state of the electronic device 100 to electrically connect the first structure 120 and the second structure 140. For example, a part of the conductive structures 160 may make electrical contact (or form an electrical connection) with part (e.g., a conductive region) of the first structure 120, and another part of the conductive structures 160 may make electrical contact with part (e.g., a conductive region) of the second structure 140. Accordingly, the first structure 120 and the second structure 140 may maintain an electrical contact state through the conductive structures 160 by at least partially containing a conductive material. The first structure 120 and the first support portion 140-1 of the second structure 140 may contain a metallic material.

The conductive structures 160 may include at least one of conductive rubber, a conductive sponge, conductive silicon, a conductive pad, an elastic body into which a conductive wire is inserted, or an elastic body coated with a conductive material (e.g., a conductive sheet or a conductive fiber). The conductive structures 160 may be formed of a material having a predetermined level of elasticity so as to absorb shock when the conductive structures 160 make contact with each other in response to operating states (e.g., the first state and the second state) of the electronic device 100. The conductive structures 160 may include a metal gasket capable of performing a noise shielding function and/or a ground function.

The electronic device 100 may include other structures (e.g., sponges or coil springs) capable of providing mobility to lower ends of the conductive structures 160 in the up/down direction (e.g., +Z/-Z-axis direction). The electronic device 100 may decrease, through the other structures operatively coupled with the conductive structures 160, physical shift shock of the electronic device 100 when the conductive structure (e.g., a first contact member 161) disposed on the first structure 120 and the conductive structures (e.g., a second contact member 162 and a third contact member 163) disposed on the second structure 140 make contact (or form a connection) with each other in response to a state change (e.g., the first state or the second state) of the electronic device 100.

The conductive structures 160 may include the first contact member 161, the second contact member 162, and the third contact member 163. The first contact member 161 may be disposed on one of the first structure 120 and the second structure 140 (e.g., the first support portion 140-1). The second contact member 162 and the third contact member 163 may be disposed on the other one of the first structure 120 and the second structure 140 on which the first contact member 161 is not disposed. Hereinafter, an embodiment in which the first contact member 161 is disposed on the first structure 120 and the second contact member 162 and the third contact member 163 are disposed on the second structure 140 will be described. The positions of the conductive structures 160 are not limited to the illustrated embodiment and may be changed. Various embodiments according to the positions of the conductive structures 160 will be described below with reference to FIGS. 6 to 10B.

The first contact member 161 may be configured to have the same potential as a ground (GND) potential of a main PCB (e.g., the circuit board member 190 or the circuit board 191 of FIG. 3) through the first structure 120. The first structure 120 may be electrically connected with a GND of the main PCB 191 through a passive element (e.g., a resistor, an inductor, or a capacitor) for prevention of electrical shock (e.g., refer to FIGS. 14, 15A, and 15B). The first contact member 161 may have the same potential as the GND potential of the main PCB 191 by making an electrical connection with at least part of the first structure 120.

The second contact member 162 and the third contact member 163 may be configured to have the same potential as a GND potential of the display 150 through the second structure 140 (or the first support portion 140-1 of the second structure 140) that supports a display 150. The second structure 140 may be electrically connected with a GND of the display 150 through a passive element (e.g., a resistor, an inductor, or a capacitor) for prevention of electrical shock (e.g., refer to FIGS. 12 and 13). The second contact member 162 and the third contact member 163 may have the same potential as a GND potential of the display PCB 154 by making electrical connection with at least part of the second structure 140.

The first contact member 161 may be disposed on the first structure 120. For example, the first contact member 161 may be disposed on the first surface 121 of the first structure 120 and may protrude toward the first support portion 140-1 (e.g., the +Z-axis direction). The first contact member 161 may make contact with the second contact member 162 in the first state of the electronic device 100 and may make contact with the third contact member 163 in the second state of the electronic device 100.

The first contact member 161 may be located adjacent to the first side surface 123 of the first structure 120. The first structure 120 may include the plurality of side surfaces 123, 124, 125, and 126 that surround the space between the first surface 121 and the second surface 122. The plurality of side surfaces 123, 124, 125, and 126 may include the first side surface 123 and the second side surface 124 that extend in a direction perpendicular to the sliding directions of the second structure 140 (e.g., the first direction D1 and the second direction D2) and that face each other, and the third side surface 125 and the fourth side surface 126 that extend in a direction parallel to the sliding directions of the second structure 140 to connect the first side surface 123 and the second side surface 124 and that face each other. The first side surface 123 may be located in the first direction D1 from the second side surface 124. The first contact member 161 may be disposed on an edge region where the first side surface 123 and the first surface 121 are connected with each other. The first contact member 161 may be disposed between the second roller member 134 and the first side surface 123 so as not to obstruct rotational motion of the second roller member 134.

The second contact member 162 and the third contact member 163 may be disposed on at least part of a structure (e.g., the second structure 140) that supports the display 150. The second contact member 162 and the third contact member 163 may be disposed on the first support portion 140-1 of the second structure 140. The first support portion 140-1 of the second structure 140 may include a first surface 141 on which the display 150 is disposed and a second surface 142 that faces a direction (e.g., -Z-axis direction) opposite to that of the first surface 141 and that faces the first surface 121 of the first structure 120. The second contact member 162 and the third contact member 163 may be disposed on the second surface 142 of the first support portion 140-1. For example, the second contact member 162 and the third contact member 163 may protrude from the second surface 142 of the first support portion 140-1 toward the first surface 121 of the first structure 120 (e.g., the -Z-axis direction) by a specified height. The second surface 142 of the first support portion 140-1 may be disposed to face the first surface 121 of the first structure 120. The size of a region where the second surface 142 of the first support portion 140-1 and the first surface 121 of the first structure 120 face each other (e.g., the size of a region where the second surface 142 of the first support portion 140-1 and the first surface 121 of the first structure 120 overlap each other when the electronic device 100 is viewed in the +Z/−Z-axis direction) may vary depending on operating states (e.g., the first state and the second state) of the electronic device 100.

The second contact member 162 and the third contact member 163 may be spaced apart from each other by a specified interval (e.g., a first distance L1) in the sliding directions of the second structure 140 (e.g., the first direction D1 and the second direction D2) such that the second contact member 162 makes contact with the first contact member 161 in the first state of the electronic device 100 and the third contact member 163 makes contact with the first contact member 161 in the second state of the electronic device 100.

The second contact member 162 and the third contact member 163 may be disposed parallel to each other in the sliding directions of the second structure 140 (e.g., the first direction D1 and the second direction D2). The second contact member 162 and the third contact member 163 may be spaced apart from each other by the first distance L1. The first distance L1 may be substantially the same as a sliding distance (e.g., a second distance L2) of the second structure 140 when the electronic device 100 is changed to the first state or the second state. The second contact member 162 may be located adjacent to the first peripheral portion 143 of the first support portion 140-1. The third contact member 163 may be spaced apart from the second contact member 162 by the first distance L1 in the second direction D2.

According to the embodiment illustrated in FIG. 5, the conductive structures 160 extend in a direction perpendicular to the sliding directions of the second structure 140 (e.g., the first direction D1 and the second direction D2).

The first contact member 161 may be formed on a partial region of the first surface 121 of the first structure 120 so as to have a specified length in a direction perpendicular to the sliding directions of the second structure 140 (e.g., the first direction D1 and the second direction D2). For example, the first contact member 161 may extend from the third side surface 125 to the fourth side surface 126. The first contact member 161 may extend from the edge at which the first surface 121 and the third side surface 125 meet to the edge at which the first surface 121 and the fourth side surface 126 meet.

The second contact member 162 and the third contact member 163 may be formed on partial regions of one surface (e.g., the second surface 142) of the first support portion 140-1 so as to have a specified length in a direction perpendicular to the sliding directions of the second structure 140 (e.g., the first direction D1 and the second direction D2). For example, the second contact member 162 may extend from the second peripheral portion 144 to the third peripheral portion 145. The second contact member 162 may extend from the edge at which the second surface 142 of the first support portion 140-1 and the second peripheral portion 144 meet to the edge at which the second surface 142 of the first support portion 140-1 and the third peripheral portion 145 meet. Furthermore, the third contact member 163 may be formed in substantially the same shape as the second contact member 162. For example, the third contact member 163 may extend from the edge at which the second surface 142 of the first support portion 140-1 and the second peripheral portion 144 meet to the edge at which the second surface 142 of the first support portion 140-1 and the third peripheral portion 145 meet.

The first contact member 161, the second contact member 162, and the third contact member 163 may extend the same length. In the case where the first contact member 161, the second contact member 162, and the third contact member 163 are formed to have a predetermined length, the first contact member 161 and the third contact member 163 may make contact with each other in the second state of the electronic device 100 to prevent infiltration of dust and/or foreign matter into a separation space between the first structure 120 and the second structure 140.

According to the embodiment illustrated in FIG. 5, the first contact member 161 is disposed on the first structure 120, and the second contact member 162 and the third contact member 163 are disposed on the second structure 140. However, the first contact member 161 may be disposed on the second structure 140, and the second contact member 162 and the third contact member 163 may be disposed on the first structure 120 (e.g., refer to FIGS. 8A and 8B and FIGS. 10A and 10B). For example, when the second contact member 162 and the third contact member 163 are disposed on the first structure 120, the third contact member 163 may be located adjacent to the first side surface 123, and the second contact member 162 may be spaced apart from the third contact member 163 in the second direction D2.

Figure 6:
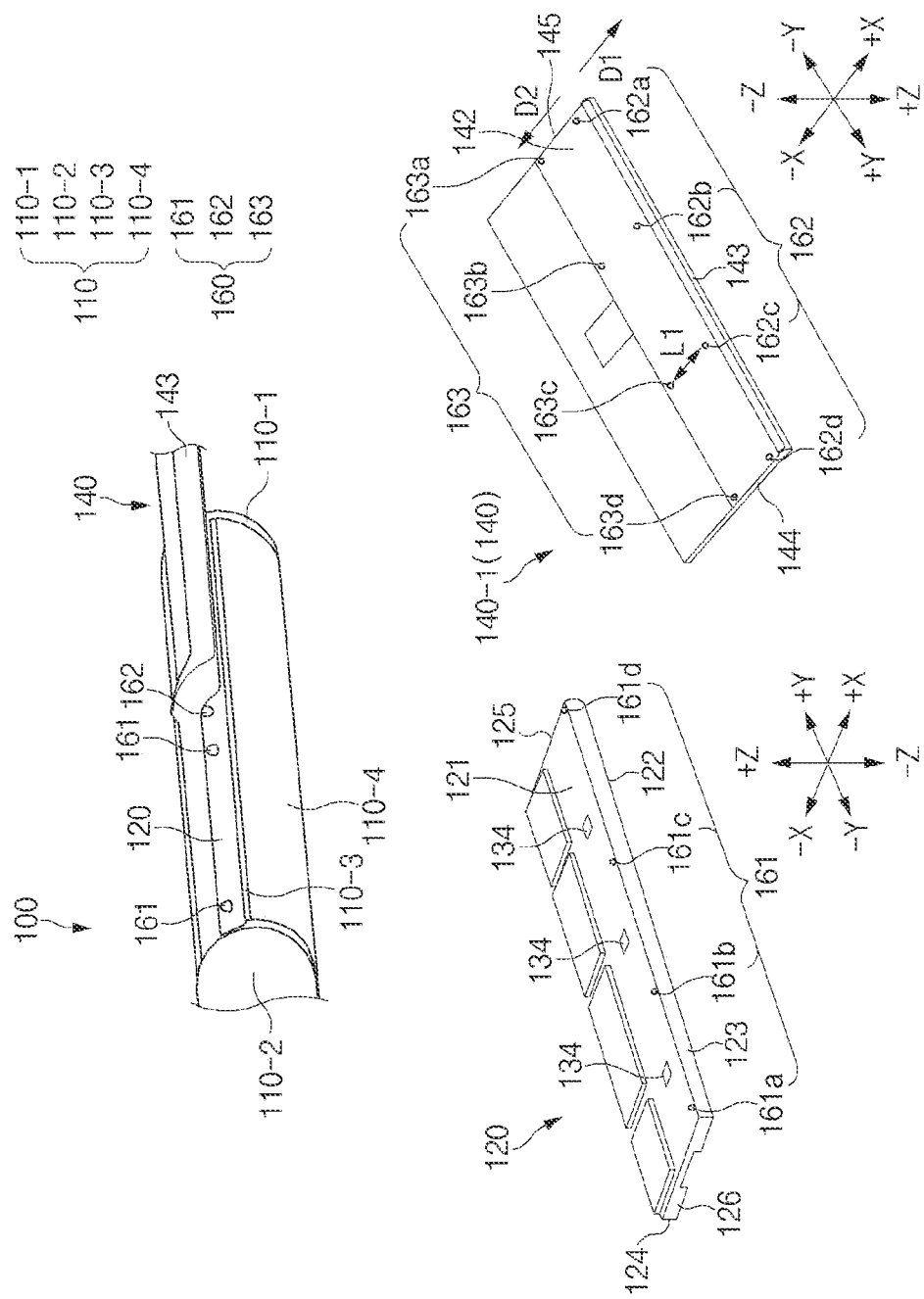
FIG. 6 illustrates the first structure, the second structure, and conductive structures of the electronic device, according to an embodiment.

FIG. 6 illustrates the first structure, the second structure, and conductive structures of the electronic device, according to an embodiment.

FIG. 6 illustrates the second state of the electronic device, the first structure, and the first support portion of the second structure. FIG. 6 is a view in which the second support portion of the second structure is omitted for convenience of description.

Referring to FIG. 6, the electronic device 100 includes the case 110, the first structure 120, the second structure 140, and the conductive structures 160.

FIG. 6 illustrates an embodiment in which the conductive structures 160 do not extend in a direction perpendicular to the sliding directions of the second structure 140 (e.g., the first direction D1 and the second direction D2) and are formed only on partial regions of the first surface 121 of the first structure 120 and/or partial regions of the second surface 142 of the first support portion 140-1. Therefore, repetitive descriptions will be omitted.

The conductive structures 160 may include a first contact member 161 disposed on the first surface 121 of the second structure 120, and a second contact member 162 and a third contact member 163 that are disposed on the second surface 142 of the first support portion 140-1 and are spaced apart from each other in the sliding directions of the second structure 140.

The first contact member 161, the second contact member 162, and the third contact member 163 may include a plurality of conductors (e.g., first conductors 161a, 162a, and 163a, second conductors 161b, 162b, and 163b, third conductors 161c, 162c, and 163c, and/or fourth conductors 161d, 162d, and 163d) that are spaced apart from each other in a direction perpendicular to the sliding directions of the second structure 140.

The first contact member 161 may include the first conductor 161a protruding from a partial region of the first surface 121 of the first structure 120 toward the first support portion 140-1 (e.g., the +Z-axis direction), the second conductor 161b spaced apart from the first conductor 161a, the third conductor 161c spaced apart from the second conductor 161b, and the fourth conductor 161d spaced apart from the third conductor 161c. The plurality of conductors 161a, 161*b*, 161*c*, and/or 161*d* of the first contact member 161 may be arranged in a direction perpendicular to the sliding directions of the second structure 140. The plurality of conductors 161*a*, 161*b*, 161*c*, and/or 161*d* of the first contact member 161 may be formed in the same size and/or shape. However, without being limited thereto, the plurality of conductors 161*a*, 161*b*, 161*c*, and/or 161*d* may be formed in different sizes and/or shapes.

The second contact member 162 may include the first conductor 162*a* protruding from a partial region of the second surface 142 of the first support portion 140-1 toward the first surface 121 of the first structure 120 (e.g., the −Z-axis direction), the second conductor 162*b* spaced apart from the first conductor 162*a*, the third conductor 162*c* spaced apart from the second conductor 162*b*, and the fourth conductor 162*d* spaced apart from the third conductor 162*c*. The plurality of conductors 162*a*, 162*b*, 162*c*, and/or 162*d* of the second contact member 162 may be arranged in a direction perpendicular to the sliding directions of the second structure 140. The plurality of conductors 162*a*, 162*b*, 162*c*, and/or 162*d* of the second contact member 162 may be formed in the same size and/or shape. However, without being limited thereto, the plurality of conductors 162*a*, 162*b*, 162*c*, and/or 162*d* may be formed in different sizes and/or shapes.

The third contact member 163 may include the first conductor 163*a* protruding from a partial region of the second surface 142 of the first support portion 140-1 toward the first surface 121 of the first structure 120 (e.g., the −Z-axis direction), the second conductor 163*b* spaced apart from the first conductor 163*a*, the third conductor 163*c* spaced apart from the second conductor 163*b*, and the fourth conductor 163*d* spaced apart from the third conductor 163*c*. The plurality of conductors 163*a*, 163*b*, 163*c*, and/or 163*d* of the third contact member 163 may be arranged in a direction perpendicular to the sliding directions of the second structure 140. The plurality of conductors 163*a*, 163*b*, 163*c*, and/or 163*d* of the third contact member 163 may be parallel to the plurality of conductors 162*a*, 162*b*, 162*c*, and/or 162*d* of the second contact member 162 and may be spaced apart from the plurality of conductors 162*a*, 162*b*, 162*c*, and/or 162*d* by the first distance L1 in the second direction D2. The plurality of conductors 163*a*, 163*b*, 163*c*, and/or 163*d* of the third contact member 163 may be formed in the same size and/or shape. However, the plurality of conductors 163*a*, 163*b*, 163*c*, and/or 163*d* may be formed in different sizes and/or shapes.

When the electronic device 100 is in the first state, the first conductor 161*a* of the first contact member 161 may make contact with the first conductor 162*a* of the second contact member 162, the second conductor 161*b* of the first contact member 161 may make contact with the second conductor 162*b* of the second contact member 162, the third conductor 161*c* of the first contact member 161 may make contact with the third conductor 162*c* of the second contact member 162, and the fourth conductor 161*d* of the first contact member 161 may make contact with the fourth conductor 162*d* of the second contact member 162.

When the electronic device 100 is in the second state, the first conductor 161*a* of the first contact member 161 may make contact with the first conductor 163*a* of the third contact member 163, the second conductor 161*b* of the first contact member 161 may make contact with the second conductor 163*b* of the third contact member 163, the third conductor 161*c* of the first contact member 161 may make contact with the third conductor 163*c* of the third contact member 163, and the fourth conductor 161*d* of the first contact member 161 may make contact with the fourth conductor 163*d* of the third contact member 163.

Referring to FIG. 6, the plurality of conductors (e.g., the first conductors 161*a*, 162*a*, and 163*a*, the second conductors 161*b*, 162*b*, and 163*b*, the third conductors 161*c*, 162*c*, and 163*c*, and/or the fourth conductors 161*d*, 162*d*, and 163*d*) of the first contact member 161, the second contact member 162, and the third contact member 163 are spaced apart from each other at the same intervals. However, the plurality of conductors may be spaced apart from each other at different intervals. Furthermore, the number of conductors may be variously modified. For example, the first contact member 161, the second contact member 162, and the third contact member 163 may omit at least one of the first conductors 161*a*, 162*a*, 163*a*, the second conductors 161*b*, 162*b*, and 163*b*, the third conductors 161*c*, 162*c*, and 163*c*, or the fourth conductors 161*d*, 162*d*, and 163*d*, or may additionally include fifth conductors.

Extension members that fill spaces between the plurality of conductors may be additionally disposed between the plurality of conductors. An extension member may be disposed between the first conductor 161*a* and the second conductor 161*b* of the first conductive member 161, between the second conductor 161*b* and the third conductor 161*c* of the first conductive member 161, and between the third conductor 161*c* and the fourth conductor 161*d* of the first conductive member 161. An extension member may be disposed between the first conductor 162*a* and the second conductor 162*b* of the second conductive member 162, between the second conductor 162*b* and the third conductor 162*c* of the second conductive member 162, and between the third conductor 162*c* and the fourth conductor 162*d* of the second conductive member 162. In addition, an extension member may be disposed between the first conductor 163*a* and the second conductor 163*b* of the third conductive member 163, between the second conductor 163*b* and the third conductor 163*c* of the third conductive member 163, and between the third conductor 163*c* and the fourth conductor 163*d* of the third conductive member 163. The extension members may not contain a conductive material, may be integrally formed with the plurality of conductors, and may fill the spaces between the plurality of conductors spaced apart from each other. Additionally, as shown in FIG. 5, the extension members may prevent infiltration of foreign matter into the separation space between the first structure 120 and the second structure 140 when the electronic device 100 is in the first state.

Figure 7A:
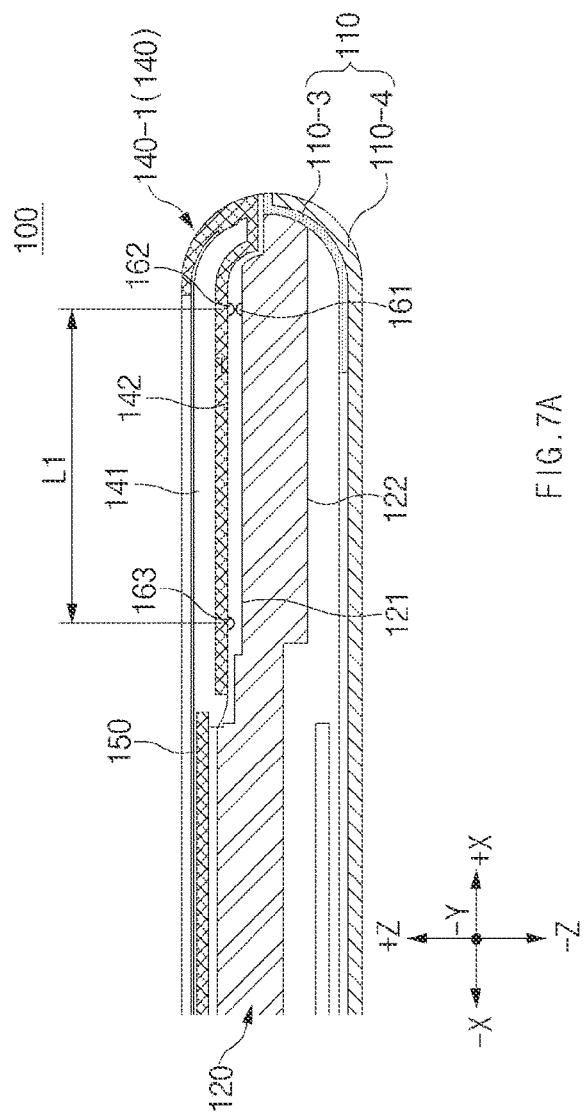
FIG. 7A illustrates an operation in which the conductive structures make contact with each other in the first state of the electronic device, according to an embodiment.
Figure 7B:
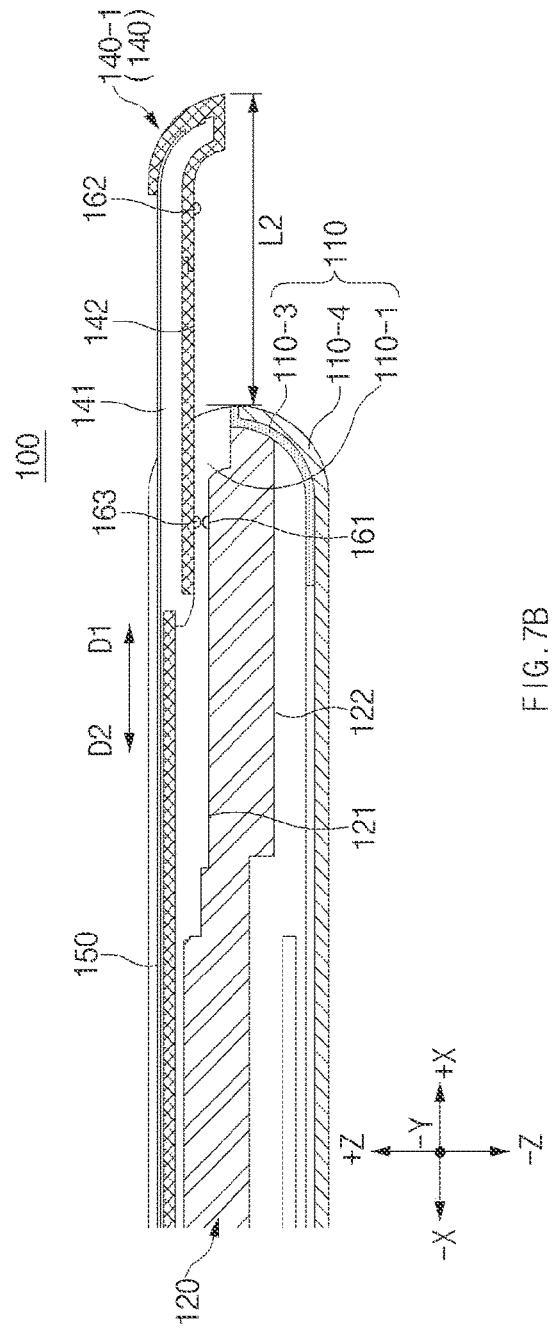
FIG. 7B illustrates an operation in which the conductive structures make contact with each other in the second state of the electronic device, according to an embodiment.

FIG. 7A illustrates an operation in which the conductive structures make contact with each other in the first state of the electronic device, according to an embodiment. FIG. 7B illustrates an operation in which the conductive structures make contact with each other in the second state of the electronic device, according to an embodiment.

FIG. 7A illustrates a state in which the first contact member and the second contact member make contact with each other in the first state of the electronic device. FIG. 7B illustrates a state in which the first contact member and the third contact member make contact with each other in the second state of the electronic device.

Referring to FIGS. 7A and 7B, the electronic device 100 includes the case 110, the first structure 120, the second structure 140, the display 150, and the conductive structures 160.

FIGS. 7A and 7B illustrate an embodiment in which, as in the embodiment illustrated in FIGS. 5 and 6, the first contact member 161 is disposed on the first structure 120 and the second contact member 162 and the third contact member 163 are disposed on the second structure 140. Therefore, repetitive descriptions will be omitted. The first contact member 161, the second contact member 162, and the third contact member 163 described with reference to FIGS. 7A and 7B may include the first contact member 161, the second contact member 162, and the third contact member 163 illustrated in FIGS. 5 and 6.

The electronic device 100 may be changed to the first state and the second state as the second structure 140 slides relative to the first structure 120 in the first direction D1 and the second direction D2. For example, the electronic device 100 may be changed to the second state as the second structure 140 slides in the first direction D1 by the second distance L2 in the first state. Furthermore, the electronic device 100 may be changed to the first state as the second structure 140 slides in the second direction D2 by the second distance L2 in the second state.

The first structure 120 may include the first surface 121 facing toward the display 150 or the second structure 130 and the second surface 122 facing away from the first surface 121 and facing the rear members 110-3 and 110-4. The second structure 140 may include the first support portion 140-1 facing the first surface 121 of the first structure 120 in the first state of the electronic device 100. The first support portion 140-1 may include the first surface 141 on which at least part of the display 150 is disposed and the second surface 142 facing away from the first surface 141 and facing the first surface 121 of the first structure 120.

The size of a region where the first surface 121 of the first structure 120 and the second surface 142 of the first support portion 140-1 face each other may be smaller when the electronic device 100 is in the second state than when the electronic device 100 is in the first state. For example, when the electronic device 100 is viewed in the +Z-axis direction or the −Z-axis direction, the size of a region where the first surface 121 of the first structure 120 and the second surface 142 of the first support portion 140-1 overlap each other may be smaller when the electronic device 100 is in the second state than when the electronic device 100 is in the first state.

The conductive structures 160 may include the first contact member 161 disposed on the first structure 120, and the second contact member 162 and the third contact member 163 disposed on the first support portion 140-1 of the second structure 140.

The first contact member 161 may be disposed on a partial region of the first surface 121 of the first structure 120 and may protrude toward the second surface 142 of the first support portion 140-1 (e.g., the +Z-axis direction). The second contact member 162 and the third contact member 163 may be disposed on the second surface 142 of the first support portion 140-1 so as to face the first surface 121 of the first structure 120 and may protrude toward the first surface 121 of the first structure 120 (e.g., the −Z-axis direction). The third contact member 163 may be spaced apart from the second contact member 162 by the first distance L1 in the second direction D2. The first distance L1 may be substantially the same as the second distance L2 by which the second structure 140 slides relative to the first structure 120.

The first contact member 161, the second contact member 162, and the third contact member 163 may extend in a direction (e.g., −Y/+Y-axis direction) perpendicular to the sliding directions of the second structure 140 (e.g., the first direction D1 and the second direction D2) (e.g., refer to FIG. 5). Furthermore, the first contact member 161, the second contact member 162, and the third contact member 163 may include the plurality of conductors (e.g., the first conductors 161a, 162a, and 163a, the second conductors 161b, 162b, and 163b, the third conductors 161c, 162c, and 163c, and/or the fourth conductors 161d, 162d, and 163d) that are spaced apart from each other in a direction (e.g., −Y/+Y-axis direction) perpendicular to the sliding directions of the second structure 140 (e.g., the first direction D1 and the second direction D2).

The conductive structures 160 may be formed in a convex protrusion shape. For example, the first contact member 161 may be formed in a shape convex toward the first support portion 140-1, and the second contact member 162 and the third contact member 163 may be formed in a shape convex toward the first structure 120. The first contact member 161, the second contact member 162, and the third contact member 163 may be formed of an elastic material.

When the electronic device 100 is in the first state, the first contact member 161 may make contact with the second contact member 162. When the second structure 140 slides in the first direction D1 in the first state, the electronic device 100 may be changed to the second state, and the first contact member 161 may make contact with the third contact member 163. In the first state of the electronic device 100, the first contact member 161 and the second contact member 162 may be aligned with each other in the up/down direction (e.g., −Z/+Z-axis direction), and convex portions of the first contact member 161 and the second contact member 162 may be brought into close contact with each other. Furthermore, in the second state of the electronic device 100, the first contact member 161 and the third contact member 163 may be aligned with each other in the up/down direction (e.g., −Z/+Z-axis direction), and convex portions of the first contact member 161 and the third contact member 163 may be brought into close contact with each other.

In the second state of the electronic device 100, a movement of the second structure 140 in the up/down direction (e.g., −Z/+Z-axis direction) may be limited by the first contact member 161 and the third contact member 163. For example, when the electronic device 100 is in the second state, the first contact member 161 and the third contact member 163 may make contact with each other in the up/down direction (e.g., −Z/+Z-axis direction) to support each other. As the first contact member 161 and the third contact member 163 support each other in the separation space between the first structure 120 and the first support portion 140-1, the first support portion 140-1 may be stably supported on the first structure 120 without being moved in the up/down direction (e.g., −Z/+Z-axis direction) when the first support portion 140-1 protrudes outside the case 110 (e.g., in the first direction D1).

The first contact member 161, the second contact member 162, and the third contact member 163 may each include a shock-absorbing structure in a sponge or spring form that provides mobility in the up/down direction (e.g., −Z/+Z-axis direction) when the first contact member 161, the second contact member 162, and the third contact member 163 make contact with each other. Accordingly, when the electronic device 100 is changed to the first state and the second state, the shock-absorbing structures may absorb shock generated by the contact between the first contact member 161, the second contact member 162, and the third contact member.

The electronic device 100 may improve ground performance, electromagnetic interference (EMI), and/or electromagnetic susceptibility (EMS) by implementing a ground connection structure of the first structure 120 and the second structure 140 using the conductive structures 160 disposed between the first structure 120 and the second structure 140.

The first structure 120 having a circuit board 191 disposed thereon may be configured to have the same potential as a ground area of the circuit board 191, and the conductive structures 160 that are disposed on the first structure 120 may be configured to have the same potential as the first structure 120. The first support portion 140-1 of the second structure 140 supporting the display 150 may be configured to have the same potential as a ground area of the display 150, and the conductive structures 160 that are disposed on the first support portion 140-1 may be configured to have the same potential as the first support portion 140-1. The conductive structure (e.g., the first contact member 161) disposed on the first structure 120 and the conductive structures (e.g., the second contact member 162 and the third contact member 163) disposed on the first support portion 140-1 may maintain an electrical contact state in the first state and the second state of the electronic device 100. The electronic device 100 may be configured such that the first structure 120 and the second structure 140 have the same potential through the conductive structures 160, and the circuit board 191 and the display 150 maintain grounds having the same potential.

Figure 12:
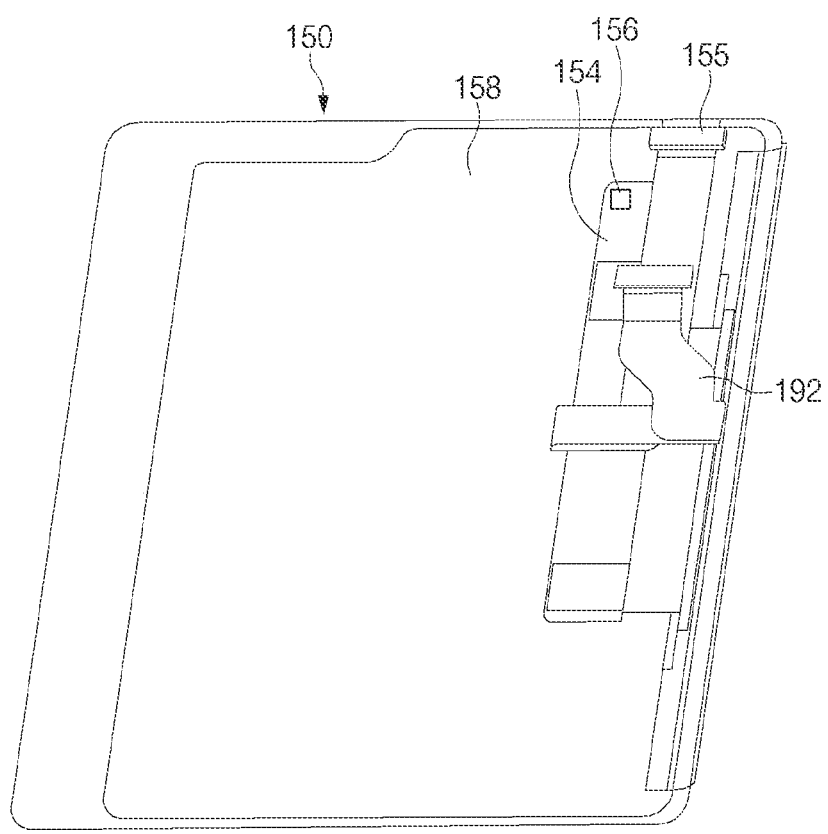
FIG. 12 illustrates a display of an electronic device, according to an embodiment.
Figure 13:
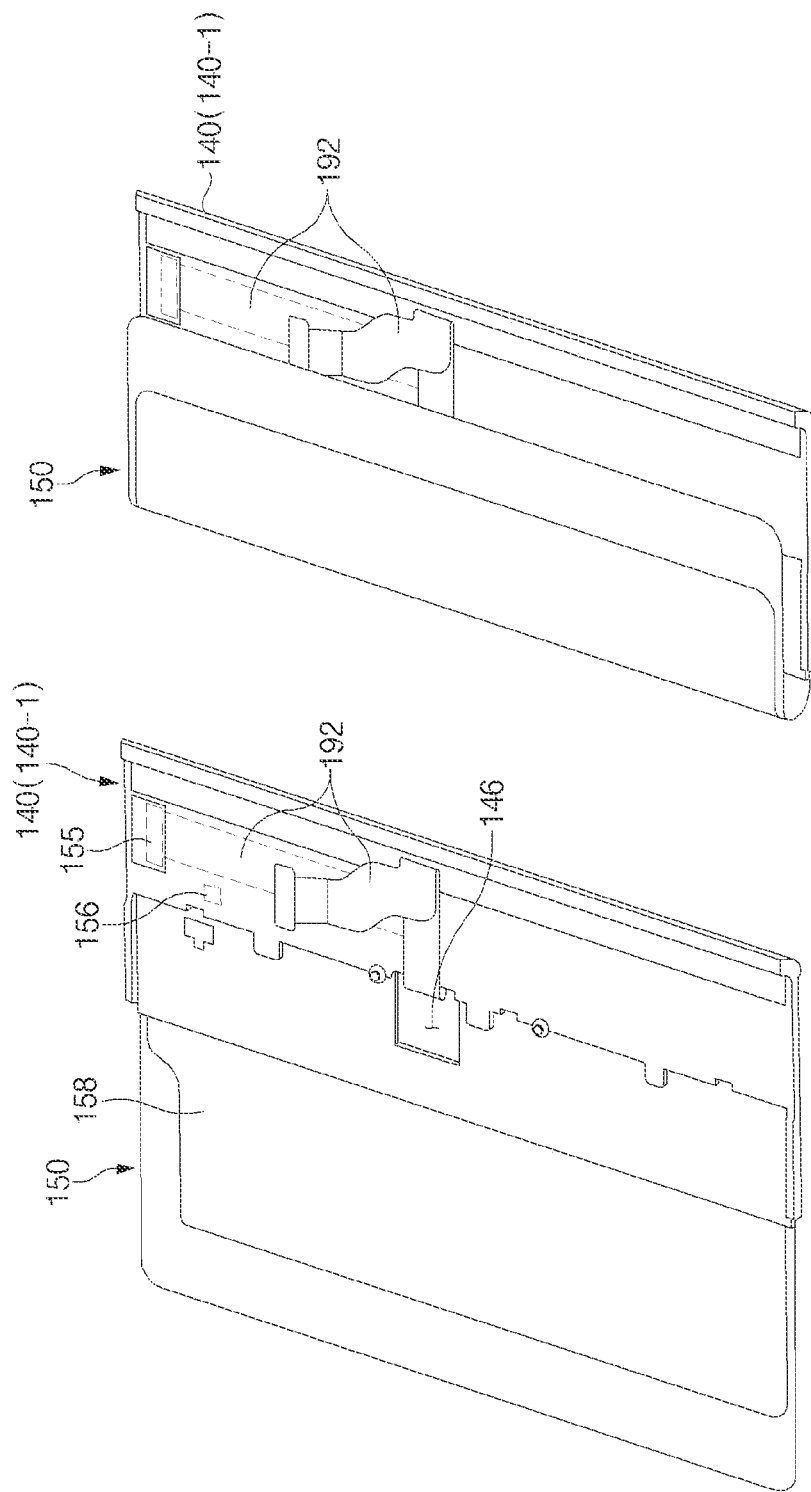
FIG. 13 illustrates a second structure and the display of the electronic device, according to an embodiment.

As the electronic device 100 has a structural feature of being changed to the first state and the second state, a connecting member (e.g., the connecting member 192) that electrically connects the display 150 and the circuit board 191 may be implemented with a long FPCB to enable sliding motion of the electronic device 100 (e.g., refer to FIGS. 12 and 13). As the connecting member 192 is formed to be long, the connecting member 192 may fail to provide a sufficient ground capacity, and when the display 150 and the circuit board 191 are ground connected only through the connecting member 192, the connecting member 192 may affect EMI/EMS performance and/or antenna performance.

The electronic device 100 may include the conductive structures 160 that bring the first structure 120 into electrical contact with the second structure 140, in addition to the connecting member 192 directly electrically connecting the circuit board 191 and the display 150, thereby improving electromagnetic compatibility (EMC) performance and/or radio frequency (RF) noise performance.

FIG. 8A illustrates an operation in which the conductive structures make contact with each other in the first state of the electronic device, according to an embodiment. FIG. 8B illustrates an operation in which the conductive structures make contact with each other in the second state of the electronic device, according to an embodiment.

FIG. 8A illustrates a state in which the first contact member and the second contact member make contact with each other in the first state of the electronic device. FIG. 8B illustrates a state in which the first contact member and the third contact member make contact with each other in the second state of the electronic device.

Referring to FIGS. 8A and 8B, the electronic device 100 includes the case 110, the first structure 120, the second structure 140, the display 150, and the conductive structures 160.

FIGS. 8A and 8B illustrate an embodiment in which the positions of the conductive structures 160 are changed such that the first contact member 161 is disposed on the second structure 140 and the second contact member 162 and the third contact member 163 are disposed on the first structure 120. Therefore, repetitive descriptions will be omitted.

The conductive structures 160 may include the first contact member 161 disposed on the first support portion 140-1 of the second structure 140, and the second contact member 162 and the third contact member 163 disposed on the first structure 120.

The first contact member 161 may be disposed on a partial region of the second surface 142 of the first support portion 140-1 and may protrude toward the first surface 121 of the first structure 120 (e.g., the −Z-axis direction). The second contact member 162 and the third contact member 163 may be disposed on the first surface 121 of the first structure 120 so as to face the second surface 142 of the first support portion 140-1 and may protrude toward the second surface 142 of the first support portion 140-1 (e.g., the +Z-axis direction). The third contact member 163 may be spaced apart from the second contact member 162 by the first distance L1 in the first direction D1. The first distance L1 may be substantially the same as the second distance L2 by which the second structure 140 slides relative to the first structure 120.

When the electronic device 100 is in the first state, the first contact member 161 may make contact with the second contact member 162. When the second structure 140 slides in the first direction D1 in the first state, the electronic device 100 may be changed to the second state, and the first contact member 161 may make contact with the third contact member 163. In the first state of the electronic device 100, the first contact member 161 and the second contact member 162 may be aligned with each other in the up/down direction (e.g., −Z/+Z-axis direction), and the convex portions of the first contact member 161 and the second contact member 162 may be brought into close contact with each other. Furthermore, in the second state of the electronic device 100, the first contact member 161 and the third contact member 163 may be aligned with each other in the up/down direction (e.g., −Z/+Z-axis direction), and the convex portions of the first contact member 161 and the third contact member 163 may be brought into close contact with each other.

Figure 9A:
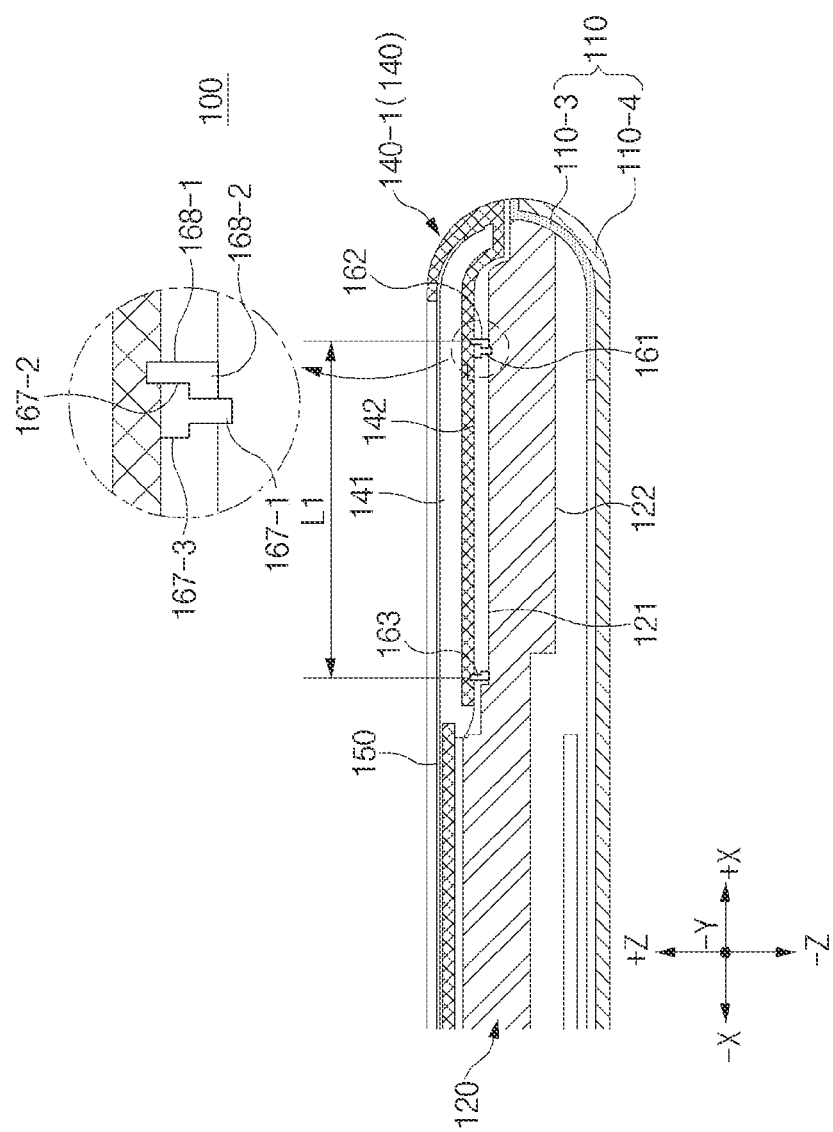
FIG. 9A illustrates an operation in which the conductive structures make contact with each other in the first state of the electronic device, according to an embodiment.
Figure 9B:
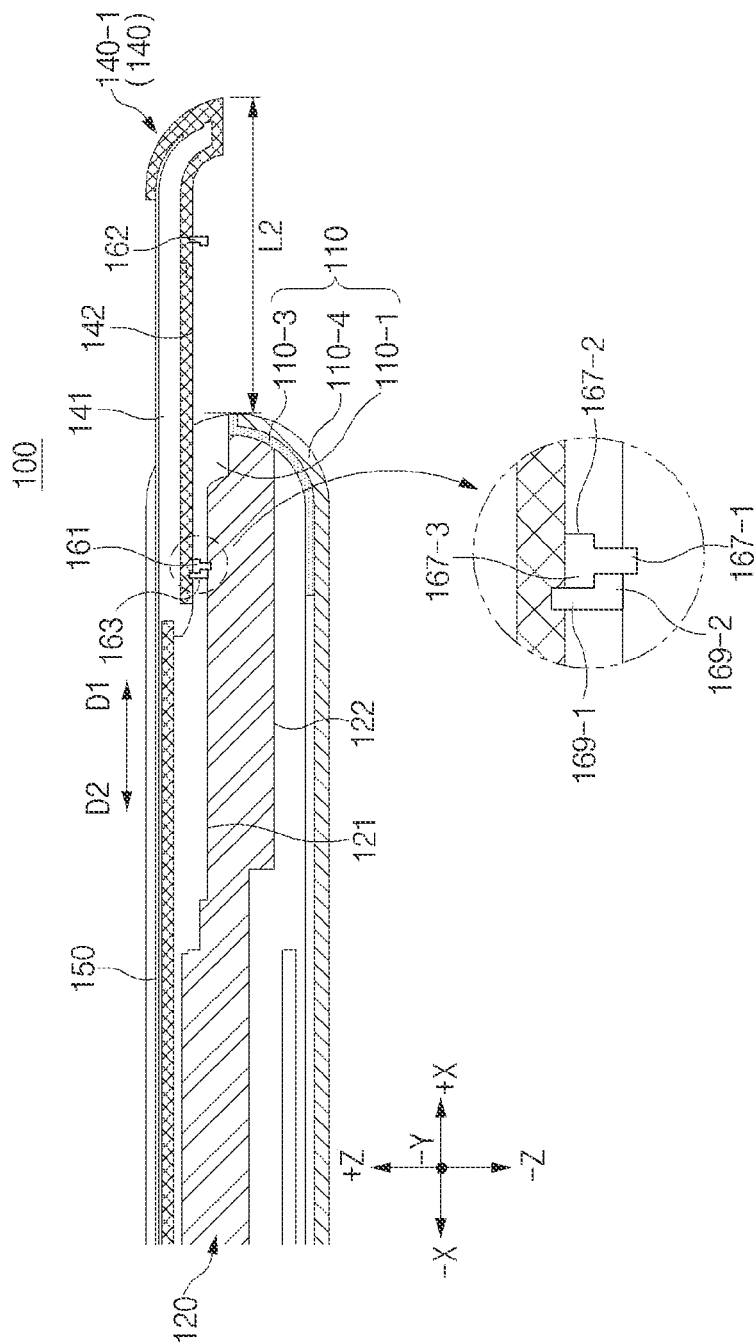
FIG. 9B illustrates an operation in which the conductive structures make contact with each other in the second state of the electronic device, according to an embodiment.

FIG. 9A illustrates an operation in which the conductive structures make contact with each other in the first state of the electronic device, according to an embodiment. FIG. 9B illustrates an operation in which the conductive structures make contact with each other in the second state of the electronic device, according to an embodiment.

FIG. 9A illustrates a state in which the first contact member and the second contact member make contact with each other in the first state of the electronic device. FIG. 9B illustrates a state in which the first contact member and the third contact member make contact with each other in the second state of the electronic device.

Referring to FIGS. 9A and 9B, the electronic device 100 includes the case 110, the first structure 120, the second structure 140, the display 150, and the conductive structures 160.

FIGS. 9A and 9B illustrate an embodiment in which the shapes of the conductive structures 160 are modified such that the conductive structures 160 include stopping structures. Therefore, repetitive descriptions will be omitted.

The conductive structures 160 may include the first contact member 161 disposed on the first structure 120, and the second contact member 162 and the third contact member 163 disposed on the first support portion 140-1 of the second structure 140. The conductive structures 160 may include the stopping structures such that at least parts thereof interlock with each other when the electronic device 100 is changed to the first state and the second state.

The first contact member 161 may include a first central portion 167-1 protruding from the first surface 121 of the first structure 120 toward the first support portion 140-1, a first protruding portion 167-2 extending from the first central portion 167-1 in the first direction D1, and a second protruding portion 167-3 extending from the first central portion 167-1 in the second direction D2. The second contact member 162 may include a second central portion 168-1 protruding from the second surface 142 of the first support portion 140-1 toward the first surface 121 of the first structure 120 and a third protruding portion 168-2 extending from the second central portion 168-1 in the second direction D2. The third contact member 163 may include a third central portion 169-1 protruding from the second surface 142 of the first support portion 140-1 toward the first surface 121 of the first structure 120 and a fourth protruding portion 169-2 extending from the third central portion 169-1 in the first direction D1. The third contact member 163 may be spaced apart from the second contact member 162 by the first distance L1 in the second direction D2. The first distance L1 may be substantially the same as the second distance L2 by which the second structure 140 slides relative to the first structure 120.

When the electronic device 100 is in the first state, the first contact member 161 may make contact with the second contact member 162. When the second structure 140 slides in the first direction D1 in the first state, the electronic device 100 may be changed to the second state, and the first contact member 161 may make contact with the third contact member 163. In the first state of the electronic device 100, the first protruding portion 167-2 of the first contact member 161 and the third protruding portion 168-2 of the second contact member 162 may be brought into close contact with each other while interlocking with each other in the up/down direction (e.g., −Z/+Z-axis direction). In the second state of the electronic device 100, the second protruding portion 167-3 of the first contact member 161 and the fourth protruding portion 169-2 of the third contact member 163 may be brought into close contact with each other while interlocking with each other in the up/down direction (e.g., −Z/+Z-axis direction).

When changed to the first state and the second state, the electronic device 100, through the conductive structures 160 including the stopping structures, may limit a sliding range of the second structure 140 and may alleviate shock generated in the change process. For example, when the electronic device 100 is changed from the first state to the second state, the third contact member 163 may be stopped by the first contact member 161, and the first contact member 161 may limit an additional movement of the first support portion 140-1 in the first direction D1. When the electronic device 100 is changed from the second state to the first state, the second contact member 162 may be stopped by the first contact member 161, and the first contact member 161 may limit an additional movement of the first support portion 140-1 in the second direction D2. Furthermore, the conductive structures 160 may contain an elastic material. Accordingly, the conductive structures 160 may absorb shock generated when the first contact member 161 makes contact with the second contact member 162 and the third contact member 163 in the process in which the electronic device 100 is changed to the first state and the second state.

Figure 10A:
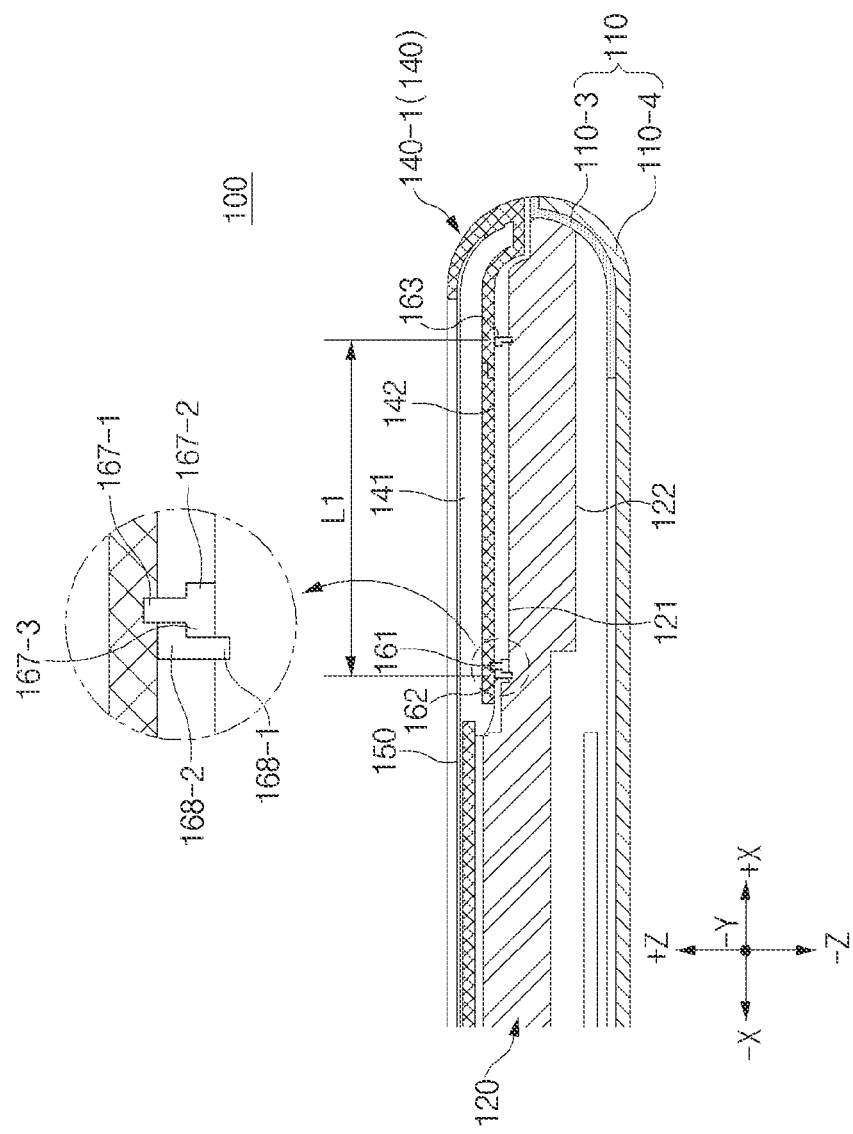
FIG. 10A illustrates an operation in which the conductive structures make contact with each other in the first state of the electronic device, according to an embodiment.
Figure 10B:
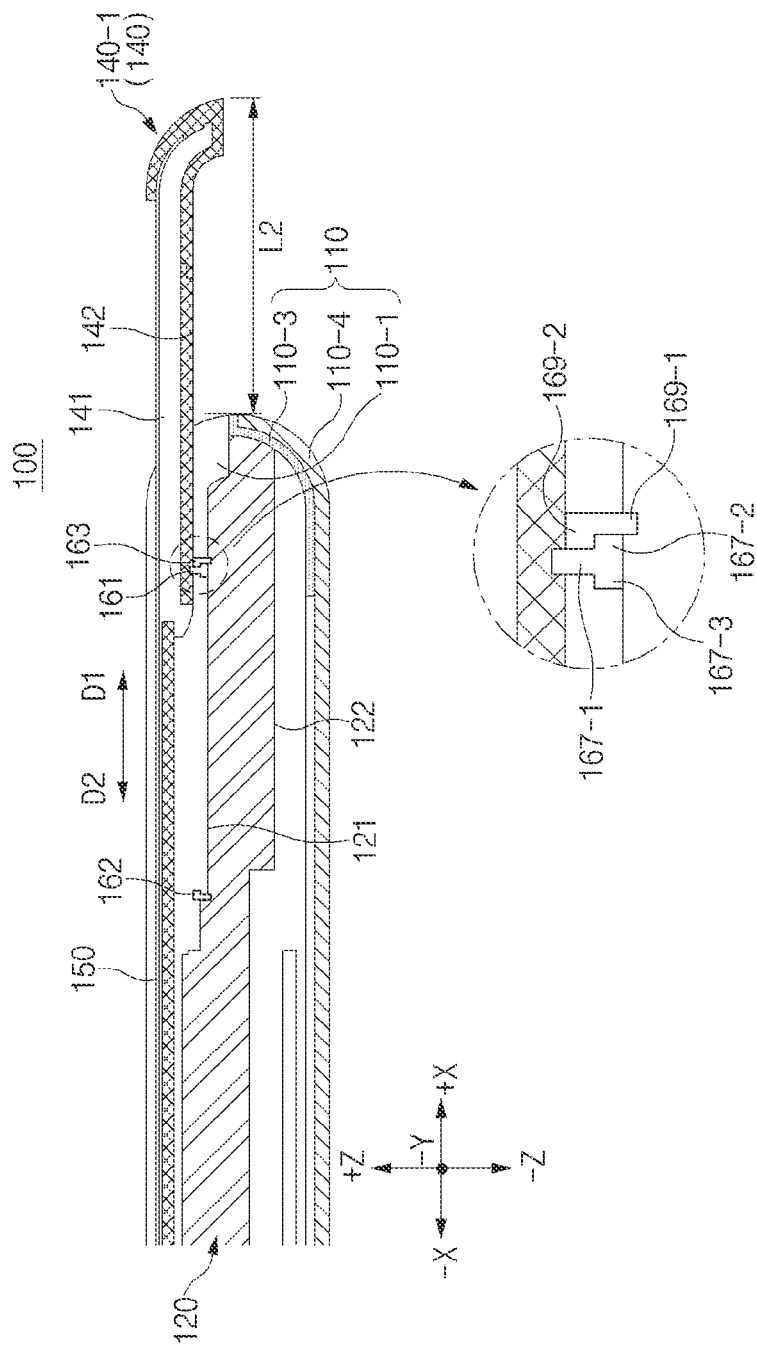
FIG. 10B illustrates an operation in which the conductive structures make contact with each other in the second state of the electronic device, according to an embodiment.

FIG. 10A illustrates an operation in which the conductive structures make contact with each other in the first state of the electronic device, according to an embodiment. FIG. 10B illustrates an operation in which the conductive structures make contact with each other in the second state of the electronic device, according to an embodiment.

FIG. 10A illustrates a state in which the first contact member and the second contact member make contact with each other in the first state of the electronic device. FIG. 10B illustrates a state in which the first contact member and the third contact member make contact with each other in the second state of the electronic device.

Referring to FIGS. 10A and 10B, the electronic device 100 includes the case 110, the first structure 120, the second structure 140, the display 150, and the conductive structures 160.

FIGS. 10A and 10B illustrate an embodiment in which the positions of the conductive structures 160 are changed such that the first contact member 161 is disposed on the second structure 140 and the second contact member 162 and the third contact member 163 are disposed on the first structure 120. Therefore, repetitive descriptions will be omitted.

The first contact member 161 may include the first central portion 167-1 protruding from the second surface 142 of the first support portion 140-1 toward the first surface 121 of the first structure 120, the first protruding portion 167-2 extending from the first central portion 167-1 in the first direction D1, and the second protruding portion 167-3 extending from the first central portion 167-1 in the second direction D2. The second contact member 162 may include the second central portion 168-1 protruding from the first surface 121 of the first structure 120 toward the second surface 142 of the first support portion 140-1 and the third protruding portion 168-2 extending from the second central portion 168-1 in the first direction D1. The third contact member 163 may include the third central portion 169-1 protruding from the first surface 121 of the first structure 120 toward the second surface 142 of the first support portion 140-1 and the fourth protruding portion 169-2 extending from the third central portion 169-1 in the second direction D2. The third contact member 163 may be spaced apart from the second contact member 162 by the first distance L1 in the first direction D1. The first distance L1 may be substantially the same as the second distance L2 by which the second structure 140 slides relative to the first structure 120.

When the electronic device 100 is in the first state, the first contact member 161 may make contact with the second contact member 162. When the second structure 140 slides in the first direction D1 in the first state, the electronic device 100 may be changed to the second state, and the first contact member 161 may make contact with the third contact member 163. In the first state of the electronic device 100, the second protruding portion 167-3 of the first contact member 161 and the third protruding portion 168-2 of the second contact member 162 may be brought into close contact with each other while interlocking with each other in the up/down direction (e.g., −Z/+Z-axis direction). In the second state of the electronic device 100, the first protruding portion 167-2 of the first contact member 161 and the fourth protruding portion 169-2 of the third contact member 163 may be brought into close contact with each other while interlocking with each other in the up/down direction (e.g., −Z/+Z-axis direction).

Figure 11:
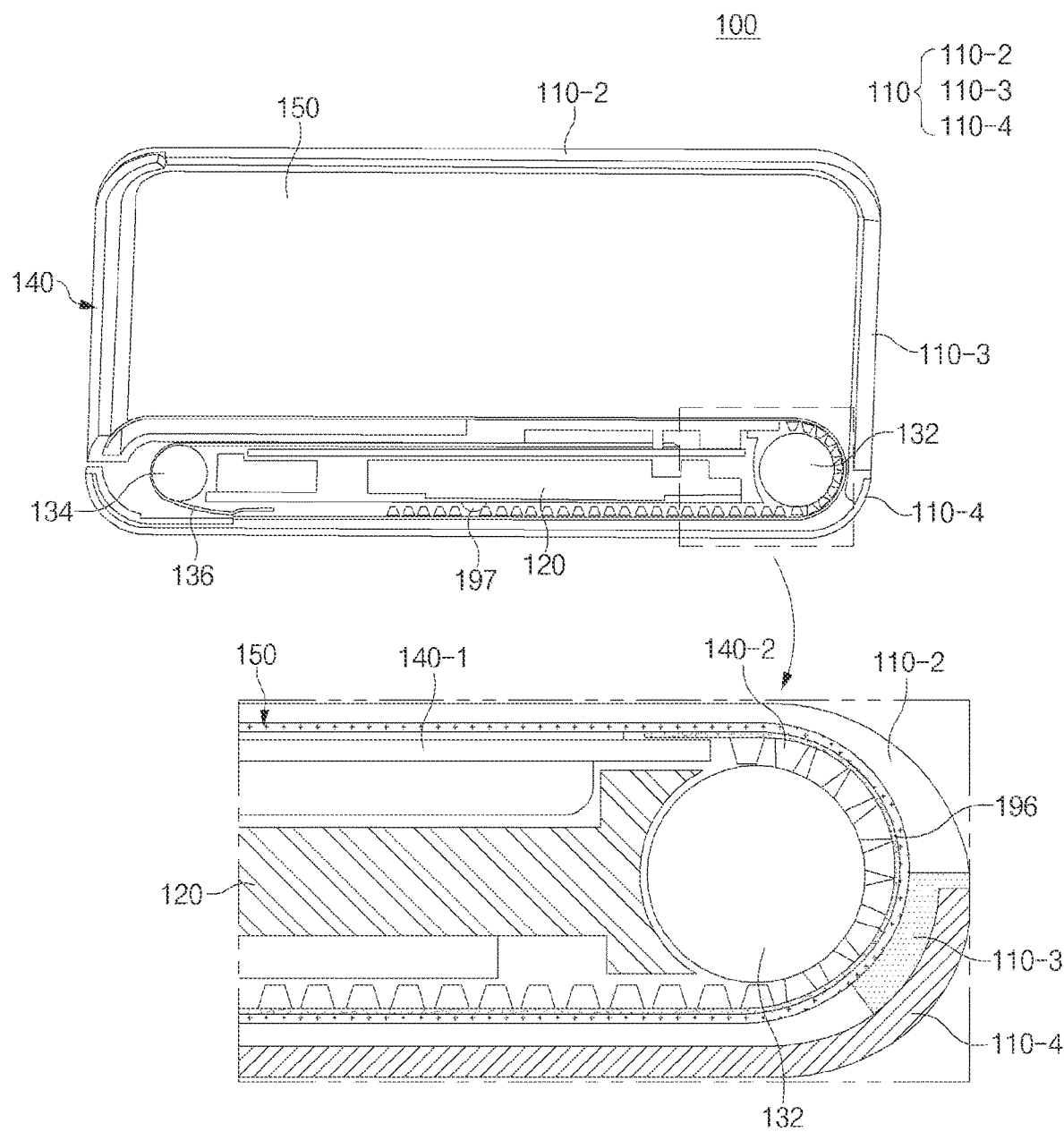
FIG. 11 illustrates an electrical contact structure of a display of the electronic device and a second support portion of the second structure, according to an embodiment.

FIG. 11 illustrates an electrical contact structure of the display of the electronic device and the second support portion of the second structure, according to an embodiment.

Referring to FIG. 11, the electronic device 100 includes the case 110, the first structure 120, the second structure 140, the display 150, the first roller member 132, the second roller member 134, and a conductive layer 196.

At least some of the components of the electronic device 100 illustrated in FIG. 11 are identical or similar to the components illustrated in FIGS. 3, 4A, and 4B. Therefore, repetitive descriptions will be omitted.

The second structure 140 may include the first support portion 140-1 and the second support portion 140-2 extending from the first support portion 140-1. For example, the second support portion 140-2 may be a bendable portion. The second support portion 140-2 may include the multi joint structure. The second structure 140 may support the display 150. For example, the display 150 may be disposed on the first support portion 140-1 and the second support portion 140-2.

The conductive layer 196 may be disposed between at least part of the second structure 140 and the display 150, and may extend from between at least part of the first support portion 140-1 and the display 150 to between the second support portion 140-2 and the display 150. However, the conductive layer 196 may also be disposed between the display 150 and the second support portion 140-2. The conductive layer 196 may be attached between the display 150 and the second support portion 140-2, and may include at least one of a conductive film, a conductive sheet, or a conductive tape. However, the conductive layer 196 and the display 150 may also be integrally formed with each other to form one part. The conductive layer 196 may serve as a conductive member (e.g., a metal sheet) of the display 150. The conductive layer 196 may be formed to be bendable and may be deformed in response to a state (e.g., the first state or the second state) change of the electronic device 100.

The conductive layer 196 may be electrically connected with the ground area of the display 150. The second support portion 140-2 may be formed of a conductive material including metal and may be electrically connected with the conductive layer 196. The second support portion 140-2 may be configured to have the same potential as the ground area of the display 150 through the conductive layer 196. The second support portion 140-2 may be electrically connected with the first structure 120 through at least one of the first roller member 132, the belt member 136, or a conductive region 197.

The ground area of the display 150 and the ground area of the circuit board 191 may be electrically connected with each other through the conductive layer 196 disposed between the display 150 and the second support portion 140-2.

FIG. 12 illustrates a display of an electronic device, according to an embodiment. FIG. 13 illustrates a second structure and the display of the electronic device, according to an embodiment.

Referring to FIGS. 12 and 13, the electronic device 100 includes the second structure 140 and the display 150. FIGS. 12 and 13 may be views in which for convenience of description, only a first support portion 140-1, and not a second support portion, is illustrated.

The display 150 may include connector modules 154 and 155 disposed on a rear surface 158 of the display 150. The connector modules 154 and 155 may be electrically connected with a circuit board 191 to drive and/or operate the display 150 and may include a drive circuit on at least part thereof. The connector modules 154 and 155 may include the display PCB 154 electrically connected with at least one of a plurality of layers included in the display 150 and the connector 155 disposed on a partial region of the display PCB 154. At least one electrical element may be disposed on the display PCB 154 and may include a drive circuit to drive the display 150. A connecting member 192 for electrical connection of the display 150 and the circuit board 191 may be connected to the connector 155.

The second structure 140 may be disposed on the rear surface 159 of the display 150. The first support portion 140-1 of the second structure 140 may be disposed to at least partially overlap the connector modules 154 and 155 when the rear surface 158 of the display 150 is viewed from above. When the second structure 140 and the display 150 are assembled, the second structure 140 may make electrical contact with the connector modules 154 and 155 of the display 150. For example, a contact region 156 may be formed on at least a partial region of the display PCB 154, and when the first support portion 140-1 is disposed on the rear surface 158 of the display 150, the contact region 156 may make contact with the first support portion 140-1. Accordingly, the second structure 140 or the first support portion 140-1, which is formed of a conductive material, and the display 150 or the display PCB 154 may be electrically connected (e.g., GND connected) with each other.

The connecting member 192 may electrically connect the display 150 and the circuit board 191. For example, one end of the connecting member 192 may be connected to the connector 155, and an opposite end of the connecting member 192 may be connected to the circuit board 191. The first support portion 140-1 may have a second opening 146 formed therein such that the connecting member 192 extends from the connector 155 to the circuit board 191 through the second opening 146. At least part of the connecting member 192 may pass through the second opening 146, and the opposite end portions of the connecting member 192 may be connected to the connector 155 and the circuit board 191, respectively (e.g., refer to FIGS. 15A and 15B).

A series capacitor or a switching element may be provided between the connecting member 192 and the display 150 or the display PCB 154. The processor 220 of the electronic device may control the switching element in response to a state change (e.g., the first state or the second state) of the display 150 and may electrically connect the display 150 and the circuit board 191 based on the control of the switching element.

Figure 14:
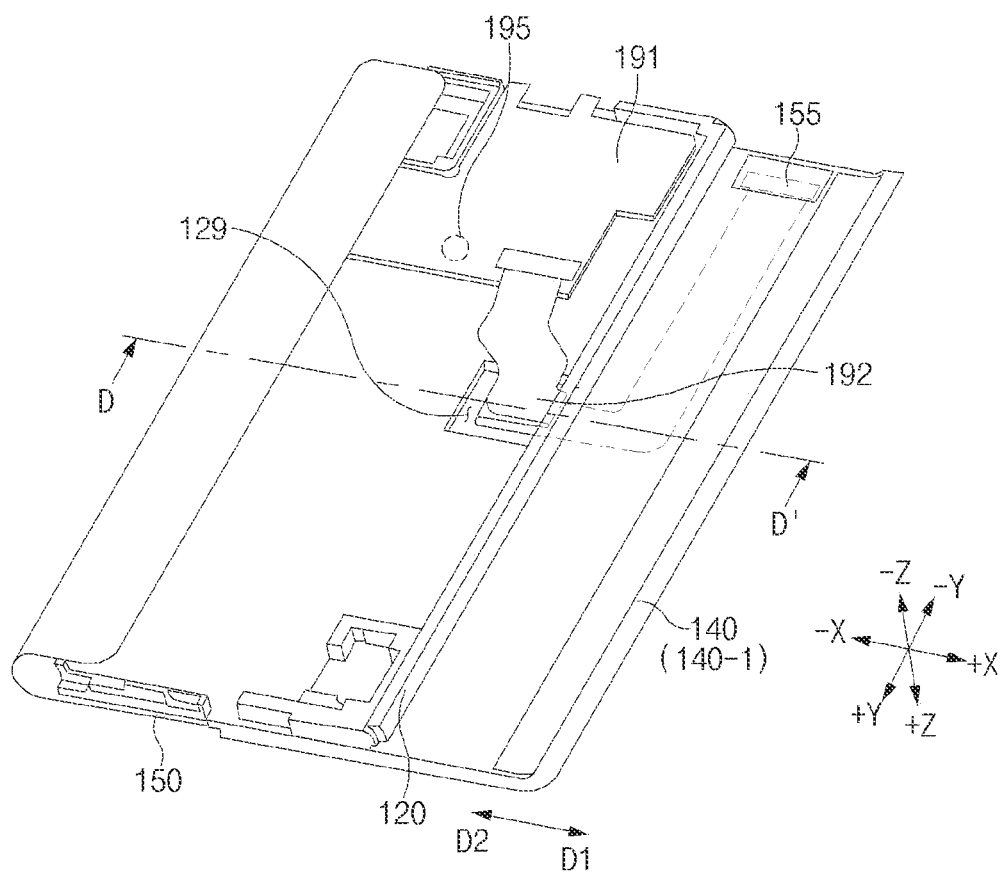
FIG. 14 illustrates an electrical connection structure of a display and a circuit board of an electronic device, according to an embodiment.
Figure 15A:
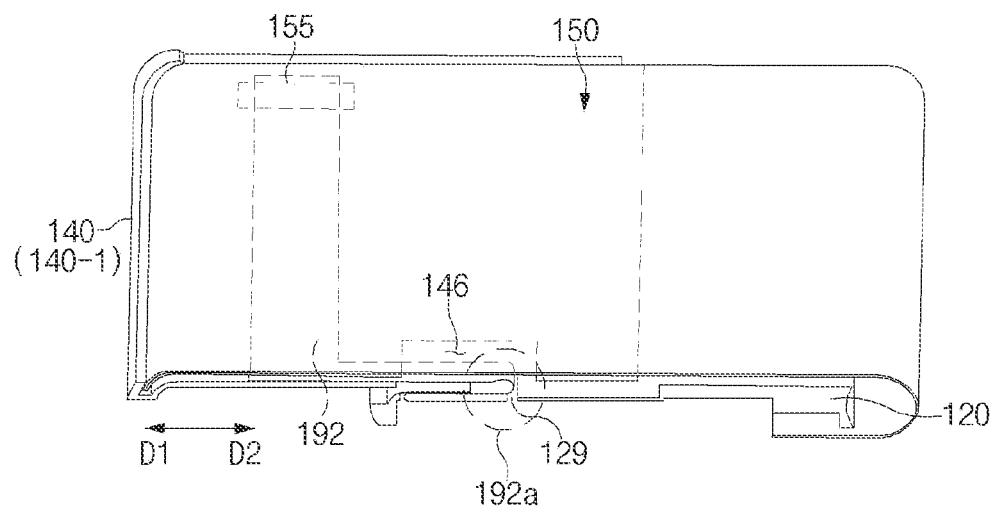
FIG. 15A illustrates the electrical connection structure of the display and the circuit board of the electronic device, according to an embodiment.
Figure 15B:
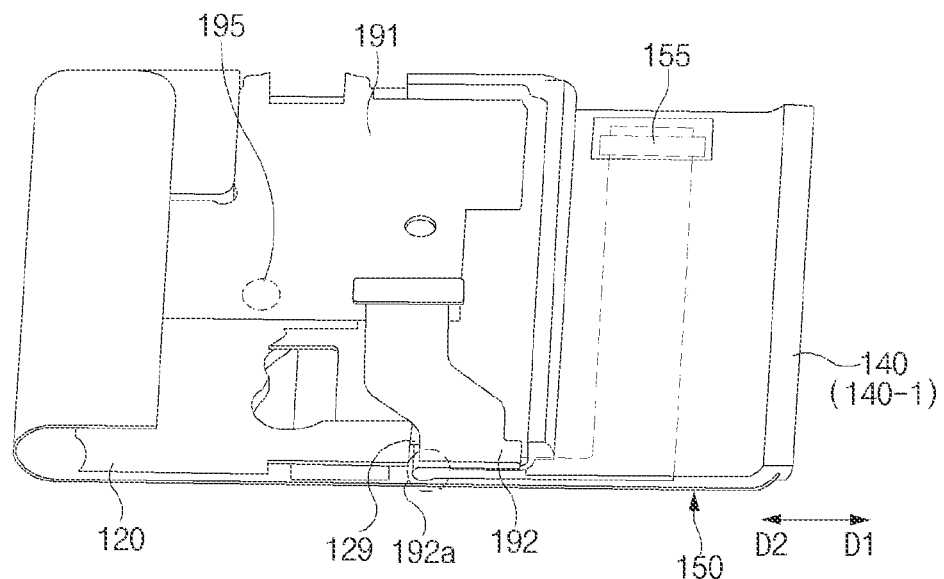
FIG. 15B illustrates the electrical connection structure of the display and the circuit board of the electronic device, according to an embodiment.

FIG. 14 illustrates an electrical connection structure of a display and a circuit board of an electronic device, according to an embodiment. FIG. 15A illustrates the electrical connection structure of the display and the circuit board of the electronic device, according to an embodiment. FIG. 15B illustrates the electrical connection structure of the display and the circuit board of the electronic device, according to an embodiment.

FIGS. 15A and 15B illustrate a section taken along line D-D' of FIG. 14.

Referring to FIGS. 14, 15A, and 15B, the electronic device 100 includes a first structure 120, a second structure 140, the display 150, the circuit board 191, and a connecting member 192. FIGS. 14, 15A, and 15B may be views in which for convenience of description, only a first support portion 140-1, and not a second support portion, is illustrated.

The electronic device 100 may be configured such that the display 150 and the circuit board 191 are electrically connected through the connecting member 192.

The circuit board 191 may be disposed on one surface (e.g., a surface facing the −Z-axis direction) of the first structure 120. The second structure 140 and at least part of the display 150 may be disposed on an opposite surface (e.g., a surface facing the +Z-axis direction) of the first structure 120 that faces away from the one surface of the first structure 120.

The first structure 120 and the circuit board 191 may be electrically connected (e.g., GND connected) with each other. A contact portion 195 making contact with the first structure 120 may be formed on at least part of the circuit board 191. The contact portion 195 may be formed on one surface (e.g., a surface facing the +Z-axis direction) of the circuit board 191 that faces the first structure 120. The contact portion 195 may make contact with the first structure 120, which is formed of a conductive material (e.g., metal), to electrically connect the first structure 120 and the circuit board 191. The contact portion 195 may be formed of a material having electrical conductivity and may include, for example, a C-clip, a conductive tape, or a conductive sponge. Furthermore, a series capacitor or a switching element may be provided between the first structure 120 and the circuit board 191. The processor 220 of the electronic device may control the switching element in response to a state (e.g., the first state or the second state) change of the display 150 and may electrically connect the first structure 120 and the circuit board 191 based on the control of the switching element.

To electrically connect the circuit board 191 and the display 150, one end portion of the connecting member 192 may be connected to a connector 155 of the display 150, and an opposite end portion of the connecting member 192 may be connected to the circuit board 191. For example, the connecting member 192 may electrically connect a ground area of the circuit board 191 and a ground area of the display 150. The connecting member 192 may extend from the one end portion to the opposite end portion thereof by a predetermined length. The connecting member 192 may include an FPCB or a cable.

The connecting member 192 may pass through at least part of the first structure 120 in the up/down direction (e.g., the −Z/+Z-axis direction) to connect the display 150 and the circuit board 191 that face each other with the first structure 120 therebetween. The first structure 120 may include a first opening 129 formed through at least a partial region of the first structure 120 in the up/down direction (e.g., the −Z/+Z-axis direction). The second structure 140 may be aligned with the first structure 120 and may include a second opening 146 formed through at least a partial region of the second structure 140 in the up/down direction (e.g., the −Z/+Z-axis direction). Between the display 150 and the second structure 140, the one end portion of the connecting member 192 may be connected to the connector 155 of the display 150. The connecting member 192 may extend from the one end portion thereof to pass through the second opening 146 and the first opening 129, and the opposite end portion of the connecting member 192 may be connected to the circuit board 191.

The display 150, together with the second structure 140, may be moved by a predetermined distance as the second structure 140 slides relative to the first structure 120 in both directions (e.g., the first direction D1 and the second direction D2). The connecting member 192 may be configured such that at least part thereof moves and/or deforms in a direction parallel to the sliding directions in response to the sliding of the second structure 140 and the display 150 relative to the first structure 120.

The connecting member 192 may include a bending portion 192*a* such that at least part of the connecting member 192 moves in a direction parallel to the sliding directions (e.g., the first direction D1 and the second direction D2). The bending portion 192*a* may be formed by bending at least part of the connecting member 192 in the sliding directions (e.g., the first direction D1 and the second direction D2). A partial region of the connecting member 192 and another partial region of the connecting member 192 that extend with the bending portion 192*a* therebetween may move in opposite directions when the second structure 140 and the display 150 slide. The bending portion 192*a* may have the shape of "U" or "S".

FIG. 16 is a block diagram of an electronic device in a network environment according to an embodiment.

Referring to FIG. 16, the electronic device 201 (e.g., the electronic device 100 of FIGS. 1 to 15) in the network environment 200 may communicate with an electronic device 202 via a first network 298 (e.g., a short-range wireless communication network), or at least one of an electronic device 204 or a server 208 via a second network 299 (e.g., a long-range wireless communication network). According to an embodiment, the electronic device 201 may communicate with the electronic device 204 via the server 208. According to an embodiment, the electronic device 201 may include a processor 220, memory 230, an input module 250, a sound output module 255, a display module 260, an audio module 270, a sensor module 276, an interface 277, a connecting terminal 278, a haptic module 279, a camera module 280, a power management module 288, a battery 289, a communication module 290, a subscriber identification module (SIM) 296, or an antenna module 297. In some embodiments, at least one of the components (e.g., the connecting terminal 278) may be omitted from the electronic device 201, or one or more other components may be added in the electronic device 201. In some embodiments, some of the components (e.g., the sensor module 276, the camera module 280, or the antenna module 297) may be implemented as a single component (e.g., the display module 260).

The processor 220 may execute, for example, software (e.g., a program 240) to control at least one other component (e.g., a hardware or software component) of the electronic device 201 coupled with the processor 220, and may perform various data processing or computation. According to one embodiment, as at least part of the data processing or computation, the processor 220 may store a command or data received from another component (e.g., the sensor module 276 or the communication module 290) in volatile memory 232, process the command or the data stored in the volatile memory 232, and store resulting data in non-volatile memory 234. According to an embodiment, the processor 220 may include a main processor 221 (e.g., a central processing unit (CPU) or an application processor (AP)), or an auxiliary processor 223 (e.g., a graphics processing unit (GPU), a neural processing unit (NPU), an image signal processor (ISP), a sensor hub processor, or a communication processor (CP)) that is operable independently from, or in conjunction with, the main processor 221. For example, when the electronic device 201 includes the main processor 221 and the auxiliary processor 223, the auxiliary processor 223 may be adapted to consume less power than the main processor 221, or to be specific to a specified function. The auxiliary processor 223 may be implemented as separate from, or as part of the main processor 221.

The auxiliary processor 223 may control at least some of functions or states related to at least one component (e.g., the display module 260, the sensor module 276, or the communication module 290) among the components of the electronic device 201, instead of the main processor 221 while the main processor 221 is in an inactive (e.g., sleep) state, or together with the main processor 221 while the main processor 221 is in an active state (e.g., executing an application). According to an embodiment, the auxiliary processor 223 (e.g., an image signal processor or a communication processor) may be implemented as part of another component (e.g., the camera module 280 or the communication module 290) functionally related to the auxiliary processor 223. According to an embodiment, the auxiliary processor 223 (e.g., the neural processing unit) may include a hardware structure specified for artificial intelligence model processing. An artificial intelligence model may be generated by machine learning. Such learning may be performed, e.g., by the electronic device 201 where the artificial intelligence is performed or via a separate server (e.g., the server 208). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 230 may store various data used by at least one component (e.g., the processor 220 or the sensor module 276) of the electronic device 201. The various data may include, for example, software (e.g., the program 240) and input data or output data for a command related thereto. The memory 230 may include the volatile memory 232 or the non-volatile memory 234.

The program 240 may be stored in the memory 230 as software, and may include, for example, an operating system (OS) 242, middleware 244, or an application 246.

The input module 250 may receive a command or data to be used by another component (e.g., the processor 220) of the electronic device 201, from the outside (e.g., a user) of the electronic device 201. The input module 250 may include, for example, a microphone, a mouse, a keyboard, a key (e.g., a button), or a digital pen (e.g., a stylus pen).

The sound output module 255 may output sound signals to the outside of the electronic device 201. The sound output module 255 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 260 may visually provide information to the outside (e.g., a user) of the electronic device 201. The display module 260 may include, for example, a display, a hologram device, or a projector and control circuitry to control a corresponding one of the display, hologram device, and projector. According to an embodiment, the display module 260 may include a touch sensor adapted to detect a touch, or a pressure sensor adapted to measure the intensity of force incurred by the touch.

The audio module 270 may convert a sound into an electrical signal and vice versa. According to an embodiment, the audio module 270 may obtain the sound via the input module 250, or output the sound via the sound output module 255 or a headphone of an external electronic device (e.g., an electronic device 202) directly (e.g., wiredly) or wirelessly coupled with the electronic device 201.

The sensor module 276 may detect an operational state (e.g., power or temperature) of the electronic device 201 or an environmental state (e.g., a state of a user) external to the electronic device 201, and then generate an electrical signal or data value corresponding to the detected state. According to an embodiment, the sensor module 276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 277 may support one or more specified protocols to be used for the electronic device 201 to be coupled with the external electronic device (e.g., the electronic device 202) directly (e.g., wiredly) or wirelessly. According to an embodiment, the interface 277 may include, for example, a high definition multimedia interface (HDMI), a USB interface, an SD card interface, or an audio interface.

A connecting terminal 278 may include a connector via which the electronic device 201 may be physically connected with the external electronic device (e.g., the electronic device 202). According to an embodiment, the connecting terminal 278 may include, for example, a HDMI connector, a USB connector, a SD card connector, or an audio connector (e.g., a headphone connector).

The haptic module 279 may convert an electrical signal into a mechanical stimulus (e.g., a vibration or a movement) or electrical stimulus which may be recognized by a user via his tactile sensation or kinesthetic sensation. According to an embodiment, the haptic module 279 may include, for example, a motor, a piezoelectric element, or an electric stimulator.

The camera module 280 may capture a still image or moving images. According to an embodiment, the camera module 280 may include one or more lenses, image sensors, image signal processors, or flashes.

The power management module 288 may manage power supplied to the electronic device 201. According to one embodiment, the power management module 288 may be implemented as at least part of, for example, a power management integrated circuit (PMIC).

The battery 289 may supply power to at least one component of the electronic device 201. According to an embodiment, the battery 289 may include, for example, a primary cell which is not rechargeable, a secondary cell which is rechargeable, or a fuel cell.

The communication module 290 may support establishing a direct (e.g., wired) communication channel or a wireless communication channel between the electronic device 201 and the external electronic device (e.g., the electronic device 202, the electronic device 204, or the server 208) and performing communication via the established communication channel. The communication module 290 may include one or more communication processors that are operable independently from the processor 220 (e.g., the AP) and supports a direct (e.g., wired) communication or a wireless communication. According to an embodiment, the communication module 290 may include a wireless communication module 292 (e.g., a cellular communication module, a short-range wireless communication module, or a global navigation satellite system (GNSS) communication module) or a wired communication module 294 (e.g., a local area network (LAN) communication module or a power line communication (PLC) module). A corresponding one of these communication modules may communicate with the external electronic device via the first network 298 (e.g., a short-range communication network, such as Bluetooth™, wireless-fidelity (Wi-Fi) direct, or infrared data association (IrDA)) or the second network 299 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 292 may identify and authenticate the electronic device 201 in a communication network, such as the first network 298 or the second network 299, using subscriber information (e.g., international mobile subscriber identity (IMSI)) stored in the subscriber identification module 296.

The wireless communication module 292 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 292 may support a high-frequency band (e.g., the mmWave band) to achieve, e.g., a high data transmission rate. The wireless communication module 292 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 292 may support various requirements specified in the electronic device 201, an external electronic device (e.g., the electronic device 204), or a network system (e.g., the second network 299). According to an embodiment, the wireless communication module 292 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 297 may transmit or receive a signal or power to or from the outside (e.g., the external electronic device) of the electronic device 201. According to an embodiment, the antenna module 297 may include an antenna including a radiating element composed of a conductive material or a conductive pattern formed in or on a substrate (e.g., a PCB). According to an embodiment, the antenna module 297 may include a plurality of antennas (e.g., array antennas). In such a case, at least one antenna appropriate for a communication scheme used in the communication network, such as the first network 298 or the second network 299, may be selected, for example, by the communication module 290 (e.g., the wireless communication module 292) from the plurality of antennas. The signal or the power may then be transmitted or received between the communication module 290 and the external electronic device via the selected at least one antenna. According to an embodiment, another component (e.g., a radio frequency integrated circuit (RFIC)) other than the radiating element may be additionally formed as part of the antenna module 297.

According to various embodiments, the antenna module 297 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 201 and the external electronic device 204 via the server 208 coupled with the second network 299. Each of the electronic devices 202 or 204 may be a device of a same type as, or a different type, from the electronic device 201. According to an embodiment, all or some of operations to be executed at the electronic device 201 may be executed at one or more of the external electronic devices 202, 204, or 208. For example, if the electronic device 201 should perform a function or a service automatically, or in response to a request from a user or another device, the electronic device 201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 201. The electronic device 201 may provide the outcome, with or without further processing of the outcome, as at least part of a reply to the request. To that end, a cloud computing, distributed computing, mobile edge computing (MEC), or client-server computing technology may be used, for example. The electronic device 201 may provide ultra low-latency services using, e.g., distributed computing or mobile edge computing. In another embodiment, the external electronic device 204 may include an internet-of-things (IoT) device. The server 208 may be an intelligent server using machine learning and/or a neural network. According to an embodiment, the external electronic device 204 or the server 208 may be included in the second network 299. The electronic device 201 may be applied to intelligent services (e.g., smart home, smart city, smart car, or healthcare) based on 5G communication technology or IoT-related technology.

An electronic device according to an embodiment of the disclosure may include a case including a rear member and side members disposed at opposite ends of the rear members, a first structure, at least part of which is disposed inside the case, a second structure connected with the first structure so as to slide relative to the first structure, a display that is disposed on the second structure and that moves together with the second structure relative to the first structure, the display including a first region and a second region extending from the first region, and a conductive structure that is disposed between at least part of the first structure and at least part of the second structure and that electrically connects the first structure and the second structure. The electronic device may include a first state in which the first region is exposed on a front surface of the electronic device and the second region is located inside the case to face the rear members and a second state in which at least part of the second region, together with the first region, is exposed on the front surface of the electronic device as at least part of the second structure slides in a first direction in the first state. The conductive structure may include a first contact member disposed on one of the first structure and the second structure, and a second contact member and a third contact member disposed on the other one of the first structure and the second structure. The second contact member and the third contact member may be spaced apart from each other by a first distance in a sliding direction of the second structure. The first contact member may make contact with the second contact member in the first state to electrically connect the first structure and the second structure and may make contact with the third contact member in the second state to electrically connect the first structure and the second structure. The second structure may slide relative to the first structure by the first distance when the electronic device is changed from the first state to the second state or from the second state to the first state.

The first structure may include a first surface that faces toward the first region of the display and a second surface that faces away from the first surface. The second structure may include a first support portion and a second support portion extending from the first support portion, the second support portion being a bendable portion. The first support portion may be disposed to face the first surface of the first structure and may be configured such that a size of a region where the first support portion and the first surface of the first structure face each other varies depending on the first state and the second state.

The first contact member may be disposed on the first surface of the first structure and may protrude toward the first support portion, and the second contact member and the third contact member may be disposed on one surface of the first support portion to face the first surface of the first structure and may protrude toward the first surface of the first structure.

The third contact member may be spaced apart from the second contact member by the first distance in a second direction opposite to the first direction.

The first contact member may be disposed on one surface of the first support portion and may protrude toward the first surface of the first structure, and the second contact member and the third contact member may be disposed on the first surface of the first structure to face the one surface of the first support portion and may protrude toward the first support portion.

The third contact member may be spaced apart from the second contact member by the first distance in the first direction.

The first structure may further include a plurality of side surfaces that surround a space between the first surface of the first structure and the second surface of the first structure. The plurality of side surfaces may include a first side surface extending in a direction perpendicular to the first direction, a second side surface that faces the first side surface, and a third side surface and a fourth side surface that connect the first side surface and the second side surface and face each other. The first side surface may be located in the first direction from the second side surface.

When the first contact member is disposed on the first structure, the first contact member may be located on the first surface of the first structure so as to be adjacent to the first side surface, and when the second contact member and the third contact member are disposed on the first structure, the third contact member may be located on the first surface of the first structure so as to be adjacent to the first side surface, and the second contact member may be located to be spaced apart from the third contact member by the first distance in a direction toward the second side surface.

The first contact member, the second contact member, and the third contact member may extend in a direction perpendicular to the first direction by a predetermined length.

Each of the first contact member, the second contact member, and the third contact member may include a first conductor and a second conductor spaced apart from the first conductor in a direction perpendicular to the first direction.

The first structure and the second structure may at least partially contain a conductive material.

The second structure 140 may slide relative to the first structure by a second distance in the first direction or a second direction opposite to the first direction, and the second distance may be equal to the first distance.

The conductive structure may include at least one of conductive rubber, a conductive sponge, conductive silicon, an elastic body into which a conductive wire is inserted, or an elastic body coated with a conductive material.

The first contact member may include a first central portion, a first protruding portion extending from the first central portion in the first direction, and a second protruding portion extending from the first central portion in a second direction opposite to the first direction. The second contact member may include a second central portion and a third protruding portion extending from the second central portion in one of the first direction and the second direction. The third contact member may include a third central portion and a fourth protruding portion extending from the third central portion in a direction opposite to the direction in which the third protruding portion extends.

The third protruding portion may be configured to interlock with one of the first protruding portion and the second protruding portion in the first state, and the fourth protruding portion may be configured to interlock with the other one of the first protruding portion and the second protruding portion in the second state.

The electronic device may further include a circuit board that is disposed on at least part of the first structure and to which the display is electrically connected. The first structure may have a first potential equal to a ground potential of the circuit board, and the second structure may have a second potential equal to a ground potential of the display. The conductive structure may allow the first potential and the second potential to form the same potential.

The first structure may include a first roller member disposed on one side of the first structure so as to be rotatable, a second roller member disposed on an opposite side of the first structure so as to be rotatable, and a belt member that is disposed to at least partially surround the second roller member and that has opposite end portions connected to the second structure. The first roller member may be configured to rotate about a first axis of rotation perpendicular to the sliding direction of the second structure in a state of making contact with the second support portion, and the second roller member may be configured to rotate about a second axis of rotation parallel to the first axis of rotation in a state of making contact with the belt member.

The second support portion may include a first edge connected with the first support portion and a second edge that forms an end portion of the second support portion, and the first edge and the second edge may be configured to move in opposite directions, respectively, when the second structure 140 slides relative to the first structure.

An electronic device 100 according to an embodiment may include a case, a first structure, at least part of which is disposed inside the case, display structures that are disposed to slide relative to the first structure and that includes a second structure slidably connected to the first structure and having at least a portion formed in a multi joint structure and a flexible display disposed on the second structure, a first roller member that is disposed between one side of the first structure and the second structure so as to be rotatable and that rotates in a state of making contact with the multi joint structure of the second structure when the second structure slides, and a conductive structure that electrically connects the first structure and the second structure and that includes a first contact member disposed on one of the first structure and the second structure, and a second contact member and a third contact member disposed on the other one of the first structure and the second structure and spaced apart from each other by a first distance in a sliding direction of the second structure The electronic device may include a first state in which a first region of the flexible display forms a front surface of the electronic device and a second region extending from the first region is located inside the case and a second state in which at least part of the second region, together with the first region, forms the front surface of the electronic device as at least part of the second structure slides in a first direction by a second distance in the first state. The first distance may be equal to the second distance, and the first contact member may make contact with the second contact member in the first state and may make contact with the third contact member in the second state.

The first structure and the second structure may at least partially contain a metallic material, and the conductive structure may include at least one of conductive rubber, a conductive sponge, or conductive silicon.

The electronic device may implement a ground contact structure of the first structure and the second structure through the conductive structures disposed between the first structure and the second structure.

Furthermore, the first structure having the circuit board disposed thereon and the second structure having the display disposed thereon may make electrical contact with each other through the conductive structures. Accordingly, the electronic device may improve ground performance and may stably maintain performance for electrical noise and external interference.

Moreover, the conductive structures may make contact with each other depending on operating states of the electronic device. Accordingly, the electronic device may prevent a movement of the electronic device and infiltration of foreign matter into the electronic device.

In addition, the conductive structures may make a connection (e.g., contact) with each other depending on operating states (e.g., the first state and the second state) of the electronic device. Accordingly, the electronic device may support the support part (e.g., the second structure) of the display such that a movement (e.g., in the up/down direction) of the support part (e.g., the second structure) does not occur and may provide a stable movement (e.g., sliding) of the display.

In addition, the disclosure may provide various effects that are directly or indirectly recognized.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 240) including one or more instructions that are stored in a storage medium (e.g., internal memory 236 or external memory 238) that is readable by a machine (e.g., the electronic device 201). For example, a processor (e.g., the processor 220) of the machine (e.g., the electronic device 201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device comprising:
a first structure;
a second structure slidably connected to the first structure;
a flexible display supported by the first structure and second structure;
and
a conductive layer disposed between a portion of the second structure and the flexible display,
wherein the second structure includes:
a first support portion supporting a first portion of the flexible display; and
a second support portion supporting a second portion of the flexible display and allowing the second portion of the flexible display to be bent,
wherein the conductive layer is formed to be bendable to partially form a curved surface and is configured to electrically connect the flexible display and the second support portion.

2. The electronic device of claim 1, wherein the second support portion is electrically connected to the first structure.

3. The electronic device of claim 2, further comprising:
a circuit board fixedly disposed on the first structure and electrically connected to the flexible display through a flexible printed circuit board,
wherein the circuit board includes a contact portion making contact with at least part of the first structure and formed of a conductive material, and
wherein the contact portion is configured to electrically connect the first structure and a ground of the circuit board.

4. The electronic device of claim 2, further comprising:
a guide member including a first roller, a second roller and a belt,
wherein the second support portion is disposed to surround at least a part of the first roller and is configured to be electrically connected with the first structure through contact to the first roller.

5. The electronic device of claim 2, further comprising:
a guide member including a first roller, a second roller and a belt, and
wherein the belt disposed to at least partially surround the second roller, the belt having opposite end portions connected to the second structure, and
wherein the second support portion is configured to be electrically connected with the first structure through the belt.

6. The electronic device of claim 2, wherein the first structure includes a conductive area making contact with at least part of the second support portion, and
wherein the second support portion is configured to be electrically connected with the first structure through the conductive area.

7. The electronic device of claim 2, wherein the second support portion is configured to have a potential equal to the ground potential of the flexible display through the conductive layer.

8. The electronic device of claim 1, wherein the second support portion includes a plurality of protrusions forming a multi-joint structure, and
wherein the plurality of protrusions extend to a predetermined length in a direction perpendicular to the sliding direction of the second structure.

9. The electronic device of claim 1, wherein the conductive layer is formed such that both sides have an adhesive force, and adheres the second support portion to the rear surface of the flexible display.

10. The electronic device of claim 1, wherein the conductive layer includes at least one of a conductive sheet, a conductive film, a conductive fiber, or a conductive tape.

11. The electronic device of claim 1, further comprising:
a case in which at least a portion of the first structure is disposed therein,
wherein the second structure is slidable in a first direction and a direction opposite to the first direction relative to the first structure and the case,
wherein the flexible display includes a first area and a second area extending from the first area,
wherein the electronic device is changed to a first state or a second state according to the sliding of the second structure,
wherein the first state is a state in which the first area is exposed on the front surface of the electronic device and the second area is located inside the case, and
wherein the second state is a state in which at least part of the second area, together with the first area, is exposed on the front surface of the electronic device as the first area slides in a first direction based on the first state.

12. The electronic device of claim 11, wherein the case includes a rear surface and side surfaces formed at both ends of the rear surface, and
wherein the second area slides-in or slides-out through a space between the first structure and the rear surface of the case.

13. The electronic device of claim 11, further comprising:
a conductive structure disposed between at least part of the first structure and at least part of the second structure and configured to electrically connect the first structure and the second structure,
wherein the conductive structure includes:
a first contact member disposed on one of the first structure or the second structure; and
a second contact member and a third contact member disposed on the first structure or the second structure which the first contact member is not disposed on, wherein the second contact member and the third contact member are spaced apart from each other by a first distance in a sliding direction of the second structure, and wherein the first contact member is configured to make contact with the second contact member in the first state to electrically connect the first structure and the second structure and is configured to make contact with the third contact member in the second state to electrically connect the first structure and the second structure.

14. The electronic device of claim 13, wherein the first structure includes a first surface configured to face toward the first support portion and a second surface configured to face away from the first surface, and wherein the first support portion and the first structure are configured such that a size of an area where the first support portion and the first surface of the first structure face each other varies depending on the first state and the second state.

15. The electronic device of claim 14, wherein the first contact member is disposed on the first surface of the first structure and protrudes toward the first support portion, and wherein the second contact member and the third contact member are disposed on one surface of the first support portion to face the first surface of the first structure and protrude toward the first surface of the first structure.

16. The electronic device of claim 15, wherein the third contact member is spaced apart from the second contact member by the first distance in a direction opposite to the first direction.

17. The electronic device of claim 14, wherein the first contact member is disposed on one surface of the first support portion and protrudes toward the first surface of the first structure, and wherein the second contact member and the third contact member are disposed on the first surface of the first structure to face the one surface of the first support portion and protrude toward the first support portion.

18. The electronic device of claim 17, wherein the third contact member is spaced apart from the second contact member by the first distance in the first direction.

19. An electronic device comprising:
a first structure;
a second structure slidably connected to the first structure;
a flexible display supported by the first structure and the second structure;
a roller disposed on one side of the first structure so as to be rotatable,
a belt having opposite end portions connected to the second structure, and
a conductive layer disposed between a portion of the second structure and the flexible display;
wherein the second structure includes a plurality of protrusions forming a multi-joint structure,
wherein the conductive layer is formed to be bendable to partially form a curved surface adjacent to the roller and is configured to electrically connect at least a part of the flexible display and the plurality of protrusions.

20. The electronic device of claim 19, wherein the plurality of protrusions is configured to be electrically connected with the first structure through at least one of the roller and the belt.

* * * * *